(12) United States Patent
Moriyama et al.

(10) Patent No.: US 11,035,414 B2
(45) Date of Patent: Jun. 15, 2021

(54) TORQUE TRANSMISSION SHAFT

(71) Applicant: NSK Ltd., Tokyo (JP)

(72) Inventors: Seiichi Moriyama, Maebashi (JP); Keisuke Nakao, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 16/644,865

(22) PCT Filed: Sep. 5, 2018

(86) PCT No.: PCT/JP2018/032838
§ 371 (c)(1),
(2) Date: Mar. 5, 2020

(87) PCT Pub. No.: WO2019/049882
PCT Pub. Date: Mar. 14, 2019

(65) Prior Publication Data
US 2020/0284299 A1 Sep. 10, 2020

(30) Foreign Application Priority Data

Sep. 7, 2017 (JP) .............................. JP2017-172096
Jan. 12, 2018 (JP) .............................. JP2018-003419

(51) Int. Cl.
*F16D 1/04* (2006.01)
*F16C 3/02* (2006.01)
*B62D 1/20* (2006.01)

(52) U.S. Cl.
CPC ................. *F16D 1/04* (2013.01); *F16C 3/02* (2013.01); *B62D 1/20* (2013.01); *Y10T 403/535* (2015.01);
(Continued)

(58) Field of Classification Search
CPC .......... F16D 1/04; F16D 1/0864; F16D 1/116; F16D 2001/103; F16D 3/387; F16C 3/02;
(Continued)

(56) References Cited

U.S. PATENT DOCUMENTS 5,006,007 A * 4/1991 Fischer ................. F16D 1/0864
403/290
7,172,361 B2 * 2/2007 Minamoto ............. B62D 1/185
403/359.5
(Continued)

FOREIGN PATENT DOCUMENTS

JP 48-3248 B1 1/1973
JP 52-166057 U1 12/1977
(Continued)

OTHER PUBLICATIONS

English translation of document C2 (Japanese-language Written Opinion (PCT/ISA/237) previously filed on Mar. 5, 2020) issued in PCT Application No. PCT/JP2018/032838 dated Nov. 27, 2018 (eight (8) pages).

(Continued)

*Primary Examiner* — Greg Binda
(74) *Attorney, Agent, or Firm* — Crowell & Moring LLP

(57) ABSTRACT

The torque transmission shaft includes: a shaft that is integrally formed and that has a yoke provided at one end portion in the axial direction and a female serration provided on the inner peripheral surface at the other end in the axial direction; and a clamp that is separate from the shaft and that is capable of reducing the diameter of the other end portion of the shaft in the axial direction; wherein the shaft and the clamp are fixed together.

9 Claims, 20 Drawing Sheets

(52) U.S. Cl.
CPC .... *Y10T 403/7033* (2015.01); *Y10T 403/7084* (2015.01)

(58) Field of Classification Search
CPC .......... Y10T 403/535; Y10T 403/7084; Y10T 403/7033; B62D 1/20
USPC .................................................. 464/134, 182
See application file for complete search history.

(56) References Cited

U.S. PATENT DOCUMENTS

| | | | |
|---|---|---|---|
| 7,726,691 B2* | 6/2010 | Yamada | B62D 1/192 |
| 8,967,017 B2* | 3/2015 | Osawa | B62D 1/184 |

FOREIGN PATENT DOCUMENTS

| | | |
|---|---|---|
| JP | 4-75229 U | 6/1992 |
| JP | 9-310724 A | 12/1997 |
| JP | 2011-220398 A | 11/2011 |
| JP | 2014-152876 A | 8/2014 |
| JP | 2016-185782 A | 10/2016 |
| JP | 2017-25964 A | 2/2017 |
| JP | 2019-52700 A | 4/2019 |

OTHER PUBLICATIONS

International Search Report (PCT/ISA/210) issued in PCT Application No. PCT/JP2018/032838 dated Nov. 27, 2018 with English translation (four (4) pages).

European Search Report issued in European Application No. 18853597.5 dated Jul. 16, 2020 (four pages).

* cited by examiner

ONE SIDE IN
THE AXIAL DIRECTION
◄—————

OTHER SIDE IN
THE AXIAL DIRECTION
—————►

ONE SIDE IN
THE AXIAL DIRECTION

OTHER SIDE IN
THE AXIAL DIRECTION

ONE SIDE IN
THE AXIAL DIRECTION

OTHER SIDE IN
THE AXIAL DIRECTION

PRIOR ART

PRIOR ART ated in FIG. 22C, there is a possibility that the whirling of
TORQUE TRANSMISSION SHAFT

TECHNICAL FIELD

The present invention relates to a torque transmission shaft incorporated in a steering apparatus for an automobile or the like.

BACKGROUND ART

FIG. 21 illustrates a conventionally known steering apparatus for an automobile as described in JP 2017-025964A. The steering apparatus includes a steering wheel 1, a steering shaft 2, a steering column 3, a pair of universal joints 4a, 4b, an intermediate shaft 5, a steering gear unit 6, and a pair of tie rods 7.

The steering wheel 1 is attached to a rear end portion of a steering shaft 2 that is rotatably supported inside the steering column 3. A front end portion of the steering shaft 2 is connected to a pinion shaft 8 of the steering gear unit 6 via the pair of universal joints 4a, 4b and the intermediate shaft 5. Then, by converting the rotation of the pinion shaft 8 into a linear motion of a rack (not illustrated), the pair of tie rods 7 is pushed and pulled, and a steering angle corresponding to the operation amount of the steering wheel 1 is applied to the steered wheels. Note that the front-rear direction refers to the front-rear direction of a vehicle body in which the steering apparatus is assembled.

The universal joints 4a, 4b connect the steering shaft 2 and the intermediate shaft 5, and the intermediate shaft 5 and the pinion shaft 8, which are rotating shafts that do not exist on the same straight line, so as to be able to transmit torque to each other. As the universal joints 4a, 4b, a cross shaft type universal joint having a pair of yokes and a cross shaft as described in JP 2011-220398A and the like is used.

CITATION LIST

Patent Literature

Patent Literature 1: JP 2017-025964A

Patent Literature 2: JP 2011-220398A

SUMMARY OF THE INVENTION

Problem to be Solved by the Invention

Incidentally, in a steering apparatus mounted in a large automobile, the distance from the steering shaft to the steering gear unit is long. For this reason, it is considered that a shaft such as a steering shaft, a pinion shaft or the like is not directly fixed to a yoke constituting a universal joint but is fixed via a torque transmission shaft also called an extension shaft.

FIG. 22A to FIG. 22C illustrate a torque transmission shaft 9 considered previously by the present inventors. The torque transmission shaft 9 is arranged between a yoke 10 and a shaft 11 such as a steering shaft, a pinion shaft or the like, and connects between the yoke 10 and the shaft 11 so that torque may be transmitted. The torque transmission shaft 9 has a male serration 12 on the outer peripheral surface at one end portion in the axial direction and a female serration 13 on the inner peripheral surface at the other end in the axial direction. The other end portion in the axial direction of the torque transmission shaft 9 is integrally provided with a clamp portion 14 for reducing the diameter of the other end portion in the axial direction of the torque transmission shaft 9. More specifically, a non-continuous portion 15 is formed at one location in the circumferential direction at the other end portion in the axial direction of the torque transmission shaft 9, and a pair of flange portions 16 is arranged on both sides of the non-continuous portion 15. Each of the flange portions 16 has an installation hole 17 for inserting a tightening member (not illustrated).

One end portion in the axial direction of the torque transmission shaft 9 is inserted inside a base portion 18 of the yoke 10, and the male serration 12 engages with a female serration 19 that is formed on the inner peripheral surface of the base portion 18 with a serration engagement. In addition, a portion between the torque transmission shaft 9 and the base 18 is welded and fixed together over the entire circumference by a weld bead portion 20.

One end portion in the axial direction of the shaft 11 is inserted inside the other end portion in the axial direction of the torque transmission shaft 9, and the female serration 13 engages with a male serration 21 that is formed on the outer peripheral surface of the shaft 11 with a serration engagement. By screwing the tip end portion of the tightening member into the installation hole 17 or a nut (not illustrated), the outer peripheral surface of the shaft 11 is strongly tightened by the inner peripheral surface of the torque transmission shaft 9.

In many cases, the torque transmission shaft 9 is manufactured by cold forging, and the shape accuracy and the dimensional accuracy are higher than in a case where the torque transmission shaft 9 is manufactured by hot forging; however, due to being integrally provided with the clamp portion 14 in which the flow of metal material is difficult or the like, it becomes difficult to ensure a high degree of coaxiality between the male serration 12 and the female serration 13 that are provided at both end portions in the axial direction of the torque transmission shaft 9. Moreover, the torque transmission shaft 9 and the yoke 10 are welded and fixed together, so the coaxiality between the torque transmission shaft 9 and the yoke 10 tends to be low due to thermal deformation or the like. For this reason, as illustrated in FIG. 22C, there is a possibility that the whirling of the shaft connected to the torque transmission shaft 9, or in other words, the shaft 11a connected via the yoke 10, or the shaft 11 connected to the female serration 13, will increase. As a result, there is a possibility that a part of the steering apparatus may generate abnormal noises such as sliding noises, stick-slip vibration noises and the like in the direction of rotation due to the whirling of the shaft.

In view of the circumstances described above, an object of the present invention is to provide a torque transmission shaft having a structure capable of suppressing whirling of a shaft connected to the torque transmission shaft.

Means for Solving the Problems

The torque transmission shaft of the present invention includes a shaft and a clamp.

The shaft has a hollow shape, and has a yoke portion provided on one end portion in the axial direction, a slit extending in the axial direction and provided on the other end portion in the axial direction, and a female serration provided on an inner peripheral surface of the other end portion in the axial direction. The yoke portion is integrated with the shaft. On the other hand, the clamp is separate from the shaft.

The clamp has a partial cylindrical shape, and has a non-continuous portion arranged at one location in the circumferential direction, and a pair of flange portions arranged on both sides of the non-continuous portion in the circumferential direction, and each flange portion has an installation hole into which a tightening member is inserted. The clamp is externally fitted around the other end portion in the axial direction of the shaft, and by reducing a width dimension of the non-continuous portion, can reduce the diameter of the other end portion in the axial direction of the shaft.

In the present invention, for example, by fixing the shaft and the clamp together by welding, the shaft and the clamp are fixed together so as not to be able to move in the axial direction. In this case, the female serration may have an incomplete serration portion at one end portion in the axial direction, in which a groove depth of the female serration groove decreases going toward one side in the axial direction, and a weld fixing portion between the shaft and the clamp can be positioned on an outer diameter side of the incomplete serration portion.

Alternatively, by pressure fitting (lightly pressure fitting) the shaft into the clamp, the shaft and the clamp may be fixed together so as not to be able to move in the axial direction.

The slit may include a stress relieving portion at one end portion in the axial direction, in other words the deepest end portion, and the stress relieving portion has a width dimension larger than a width dimension of a portion of the slit adjacent to the other side in the axial direction of the stress relieving portion. The stress relieving portion may have, for example, a circular shape, an elliptical shape, a drop shape or the like in plan view, and may have an inner surface that is a concave curved surface.

Alternatively, the one end portion in the axial direction of the slit, in other words, the deepest end portion, may be located farther on the one side in the axial direction than one end edge in the axial direction of the female serration. In this case, the shaft may have a small-diameter cylindrical portion at the other end portion in the axial direction, the female serration may be provided only on the inner peripheral surface of the small-diameter cylindrical portion, and the one end portion in the axial direction of the slit, or in other words, the deepest end portion, may be located farther on the one side in the axial direction than the small-diameter cylindrical portion, and may be positioned in a portion having an outer diameter dimension and inner diameter dimension that are larger than those of the small-diameter cylindrical portion. Furthermore, the shaft may have a conical cylindrical portion in a portion adjacent to one side in the axial direction of the small-diameter cylindrical portion, the conical cylindrical portion having an outer diameter dimension and an inner diameter dimension that increase going toward the one side in the axial direction; and the one end portion in the axial direction of the slit may be positioned farther on the one side in the axial direction than the conical cylindrical portion.

The shaft, in portions of the inner peripheral surface that are adjacent to both sides of the slit in the circumferential direction, may have toothless portions in which the female serration is not provided.

The shaft may have an engaging concave groove that extends in a direction orthogonal to the center axis of the shaft at a portion of the outer peripheral surface facing the opening portions of the installation holes, with the tightening member being arranged therein.

The positions in the circumferential direction of the slit and the non-continuous portion may coincide with each other, and the width dimension of the slit and the width dimension of the non-continuous portion in the free state of the shaft and the clamp may be the same.

The clamp may have a hardness that is higher than the shaft, and may have a projecting portion that is provided on an inner peripheral surface of an insertion hole of the clamp into which the shaft is inserted and that bites into the outer peripheral surface of the shaft.

The projecting portion may be arranged on a portion of the inner peripheral surface of the insertion hole on the opposite side from the non-continuous portion with in the diametric direction of the insertion hole.

The outer peripheral surface of the shaft and the inner peripheral surface of the insertion hole of the clamp into which the shaft is inserted may engage with a non-circular engagement so that relative rotation is not possible.

In this case, the shaft may have a flat portion (linear portion) in at least a part of the outer peripheral surface in the circumferential direction and in at least a part of the inner peripheral surface of the insertion hole in the circumferential direction.

The shaft may have a step surface on the outer peripheral surface facing toward the other side in the axial direction; and by abutting the clamp against the step surface, the clamp may be positioned in the axial direction with respect to the shaft.

Effect of Invention

With the torque transmission shaft of the present invention, whirling of a shaft connected to the torque transmission shaft may be effectively suppressed.

MODES FOR CARRYING OUT THE INVENTION

First Example

Figure 1:
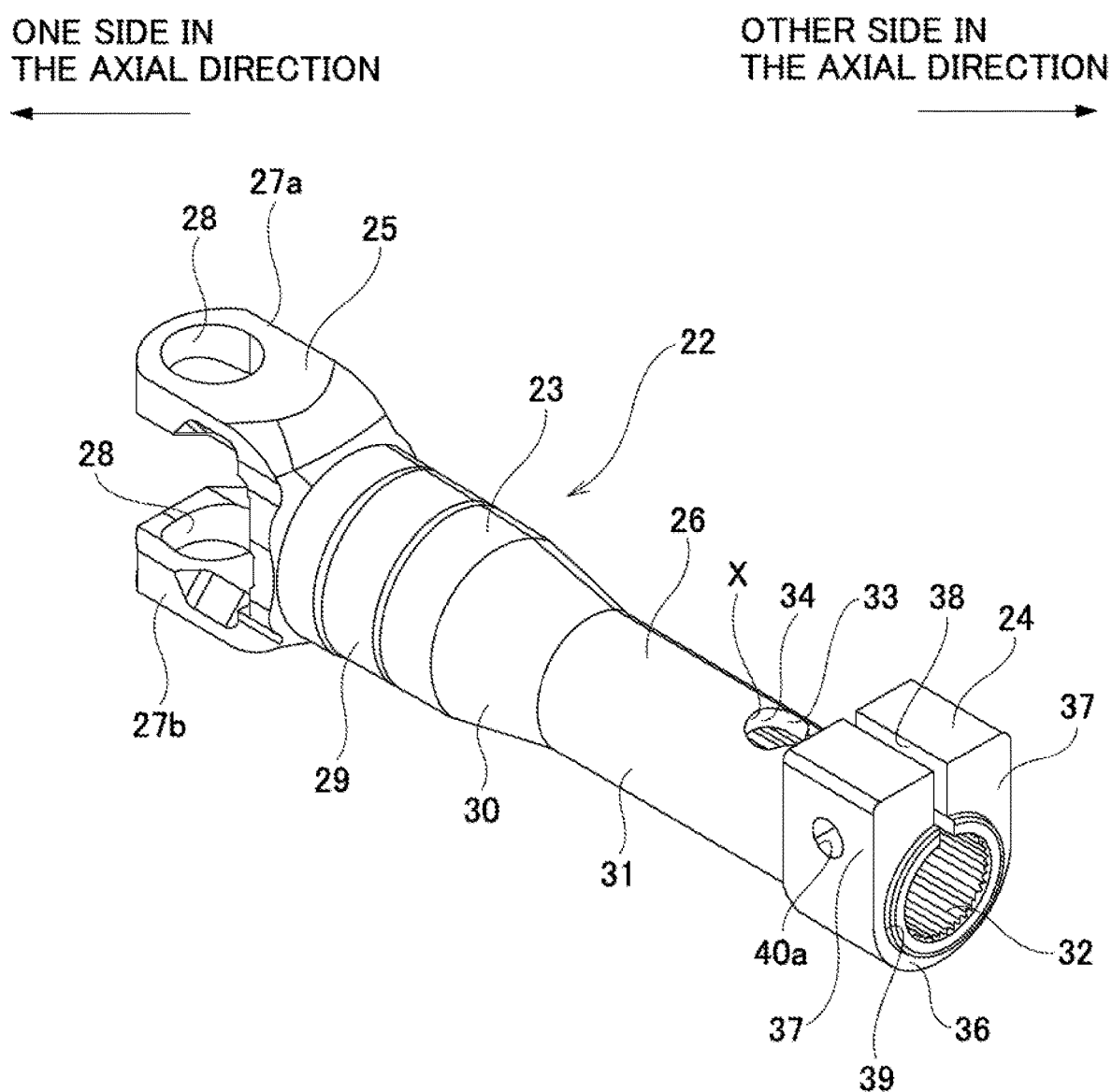
FIG. 1 is a perspective view illustrating a torque transmission shaft according to a first example of an embodiment of the present invention.
Figure 2:
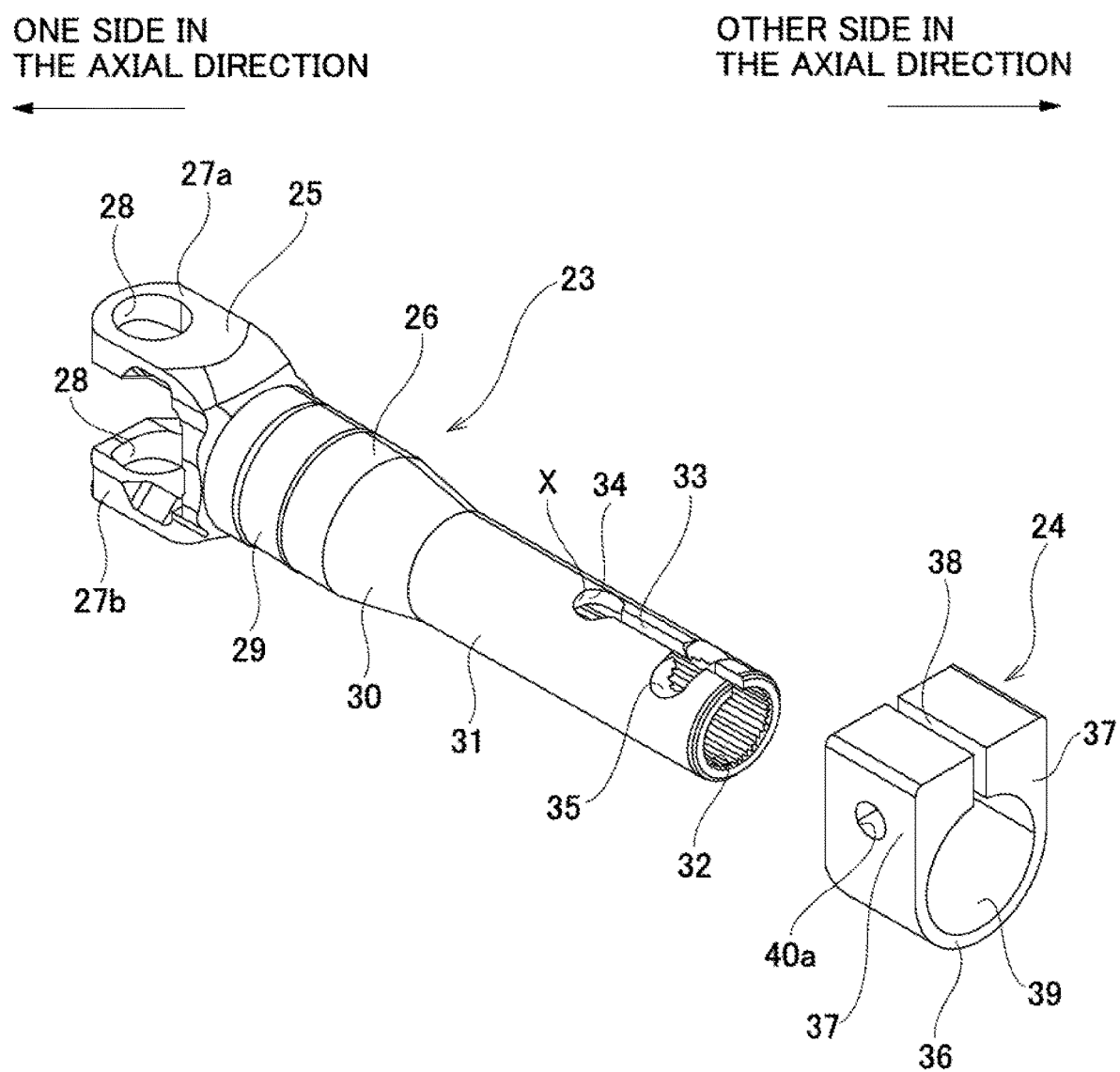
FIG. 2 is an exploded perspective view illustrating the torque transmission shaft according to the first example.
Figure 3:
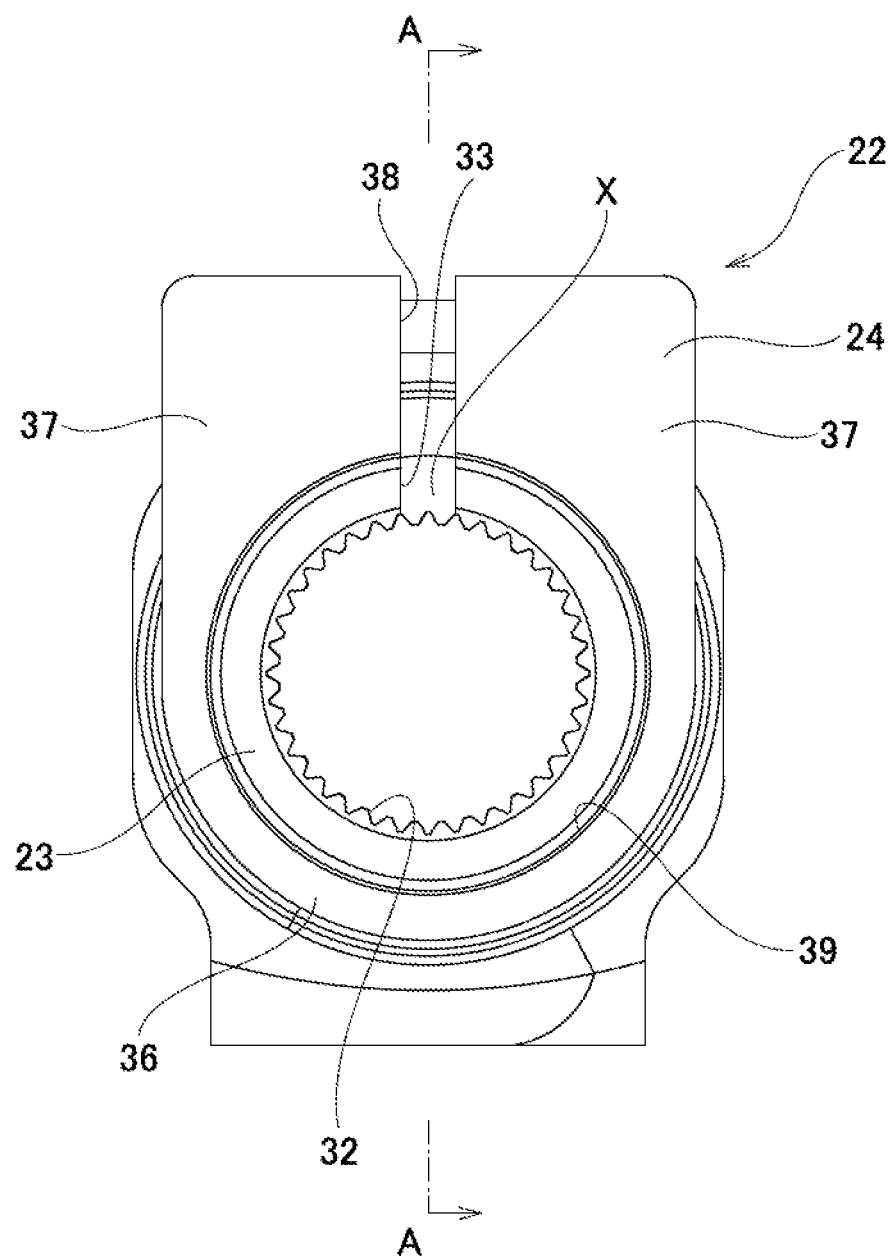
FIG. 3 is an end view illustrating the torque transmission shaft according to the first example, as viewed from the other side in the axial direction.
Figure 4:
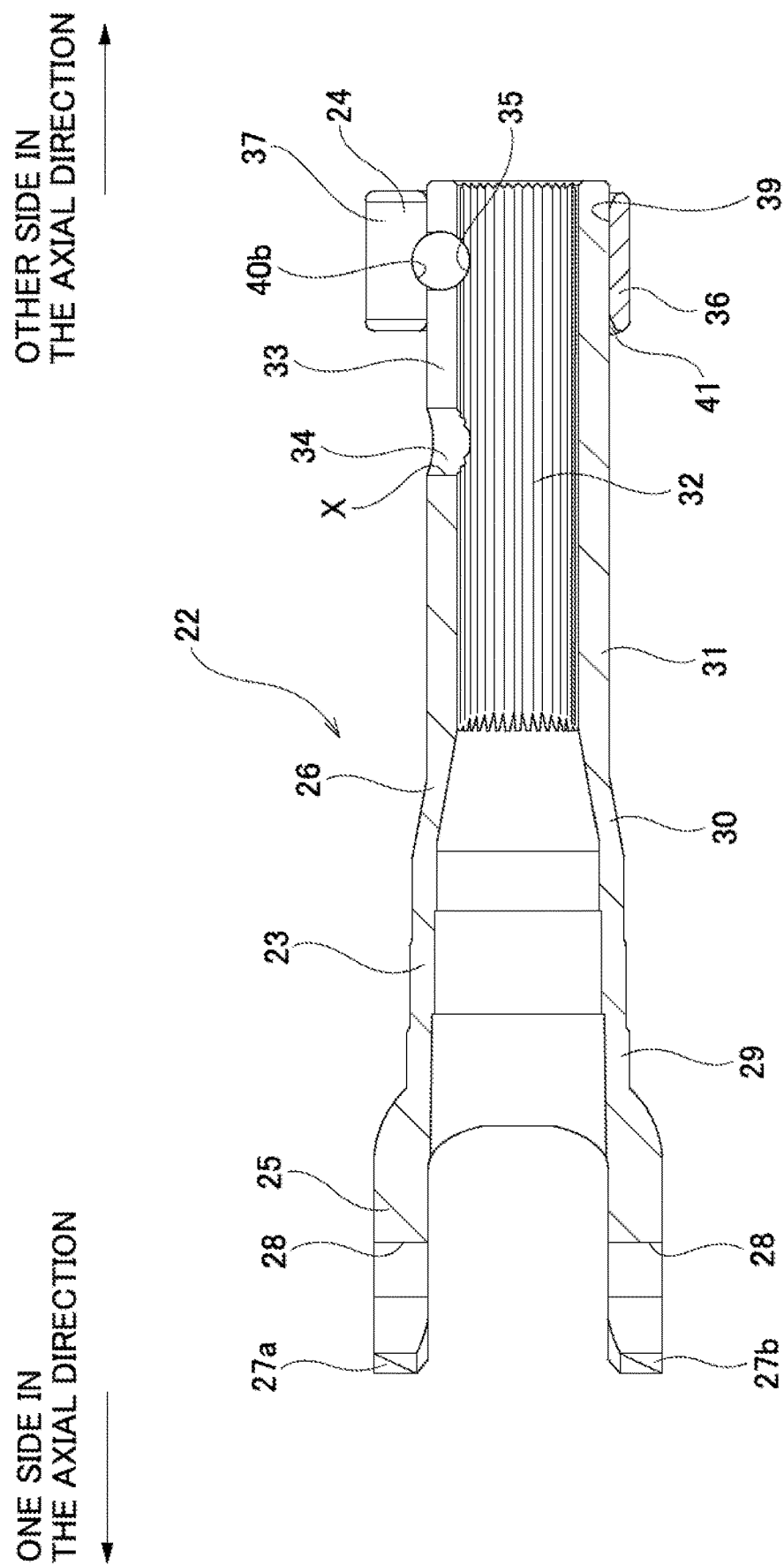
FIG. 4 is a cross-sectional view taken along the section line A-A in FIG. 3.
Figure 5:
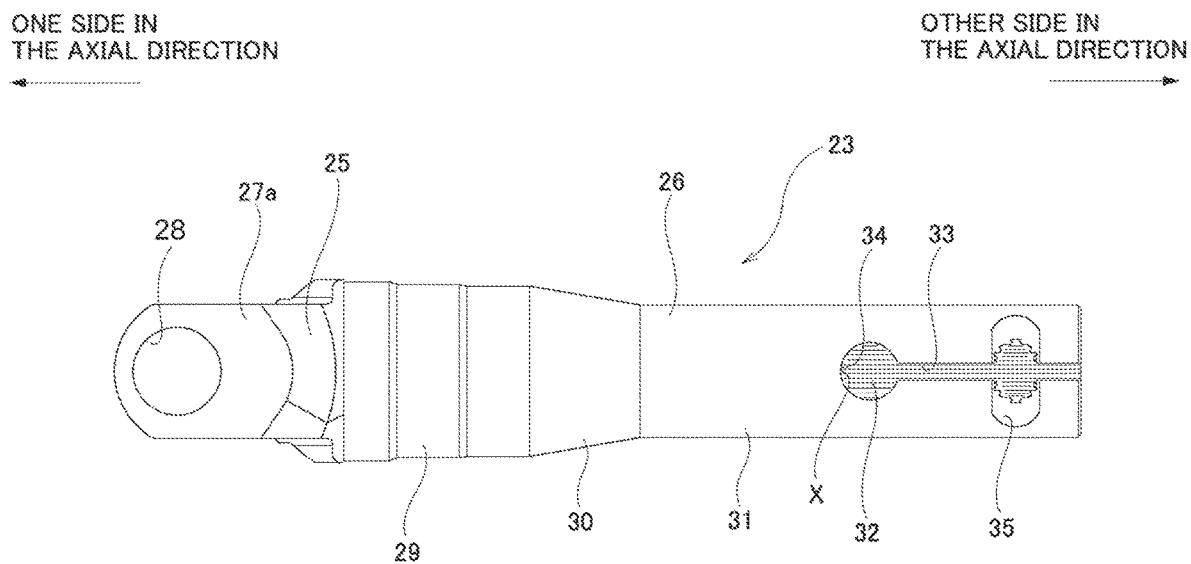
FIG. 5 is a plan view illustrating a shaft of the torque transmission shaft according to the first example.
Figure 6:
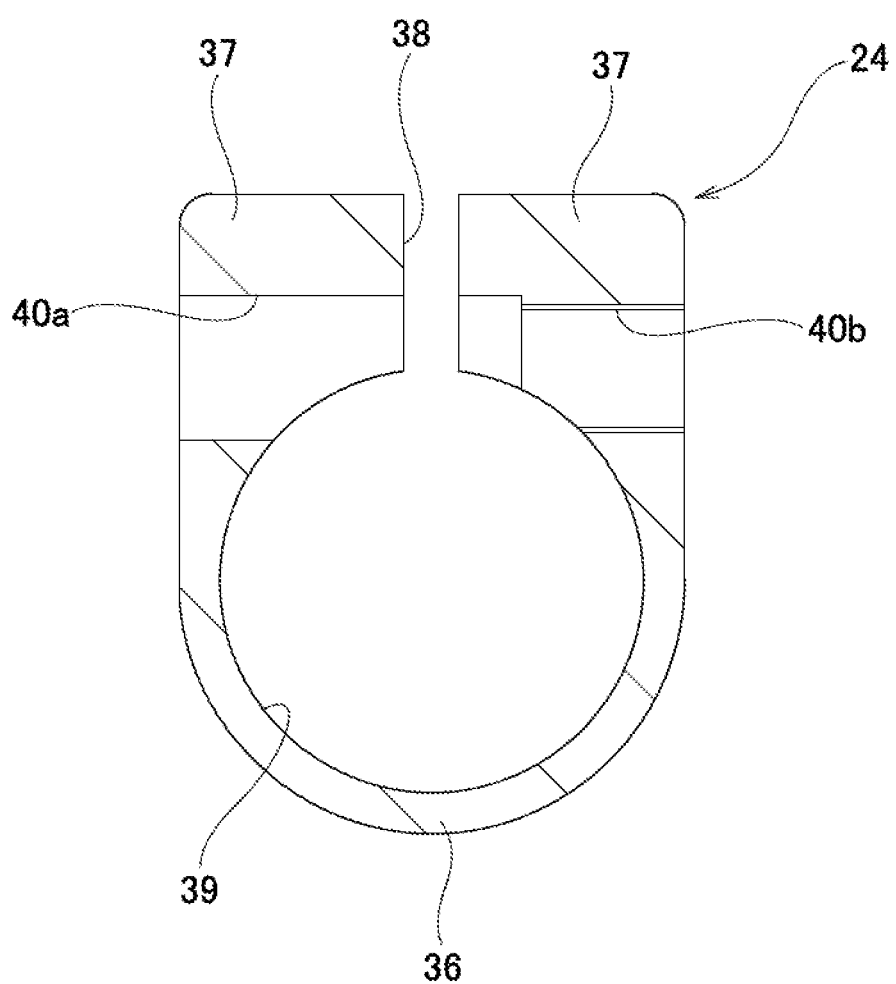
FIG. 6 is a cross-sectional view illustrating a clamp of the torque transmission shaft according to the first example.

A first example of an embodiment of the present invention will be described with reference to FIG. 1 to FIG. 8. The torque transmission shaft 22 of the present example is, for example, a rotating shaft that is assembled in a steering apparatus of a large-sized automobile, and is used to connect between a steering shaft and an intermediate shaft or between an intermediate shaft and a pinion shaft, which are rotating shafts that are not collinear with each other.

The torque transmission shaft 22 includes a cylindrical shaft 23 having a hollow shape and clamp 24 having a partial cylindrical shape (substantially U-shaped) which are configured to be separate from each other. Note that in the following description, the axial direction refers to the axial direction of the torque transmission shaft 22 unless specified otherwise. In addition, one end side in the axial direction refers to the side where the yoke portion 25 exists, and is the left end side in FIG. 1, FIG. 2, FIG. 4, FIG. 5, FIG. 7, and FIG. 8. The other end side in the axial direction refers to the side on which the clamp 24 is arranged, and is the right end side in FIG. 1, FIG. 2, FIG. 4, FIG. 5, FIG. 7, and FIG. 8.

The shaft 23 is integrally formed as a whole by performing forging (cold forging or hot forging), machining and the like of a raw material such as a carbon steel cast steel material (SC material) or the like. The shaft 23 includes a forked yoke portion 25 at one end portion in the axial direction, and a cylindrical portion 26 at the other end portion and the middle portion in the axial direction.

The yoke portion 25 constitutes a cross-shaft type universal joint, and includes a pair of arm portions 27a, 27b. The pair of arm portions 27a, 27b extend to the one side in the axial direction from two diametrically opposite sides of one end edge in the axial direction of the cylindrical portion 26. The pair of arm portions 27a, 27b have circular holes 28 that are coaxial with each other. In each of the circular holes 28, a bearing cup and needles (not illustrated) for rotatably supporting a shaft portion constituting a cross shaft are arranged inside.

The cylindrical portion 26 of the shaft 23 has a hollow cylindrical shape as a whole, and includes a large-diameter cylindrical portion 29, a conical cylindrical portion 30, and a small-diameter cylindrical portion 31 in that order from the one side in the axial direction.

The large-diameter cylindrical portion 29 has a stepped cylindrical shape, and the other end edge in the axial direction of the large-diameter cylindrical portion 29 is connected to the one end edge in the axial direction of the conical cylindrical portion 30. The outer diameter and the inner diameter of the large-diameter cylindrical portion 29 are larger than the outer diameter and the inner diameter of the small-diameter cylindrical portion 31.

The conical cylindrical portion 30 has a partial conical cylindrical shape, and the outer diameter and the inner diameter of the conical cylindrical portion 30 become smaller going toward the other side in the axial direction. The other end edge in the axial direction of the conical cylindrical portion 30 is connected to the one end edge in the axial direction of the small-diameter cylindrical portion 31.

Figure 7:
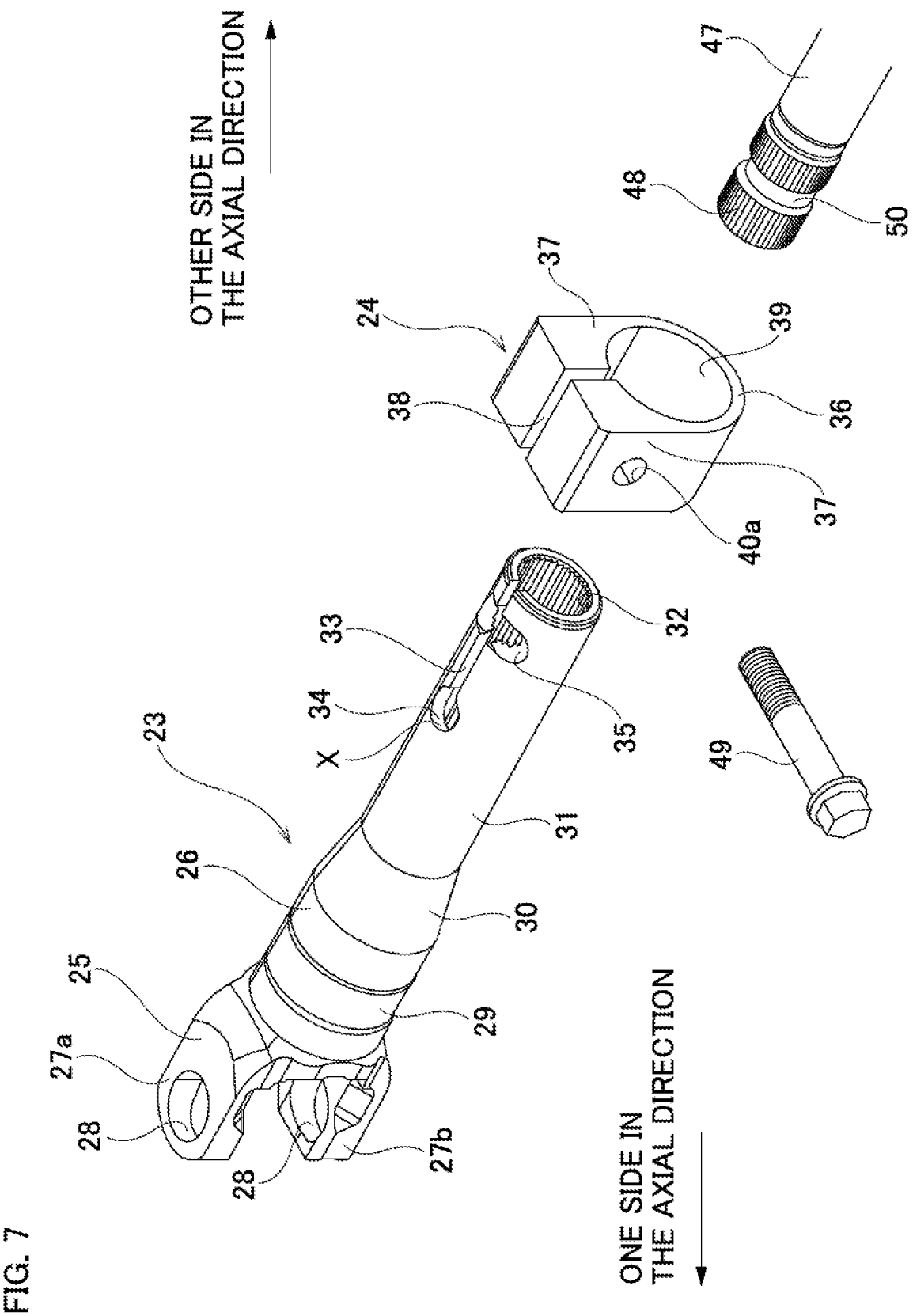
FIG. 7 is an exploded perspective view illustrating the torque transmission shaft and a shaft connected to the torque transmission shaft according to the first example.
Figure 8:
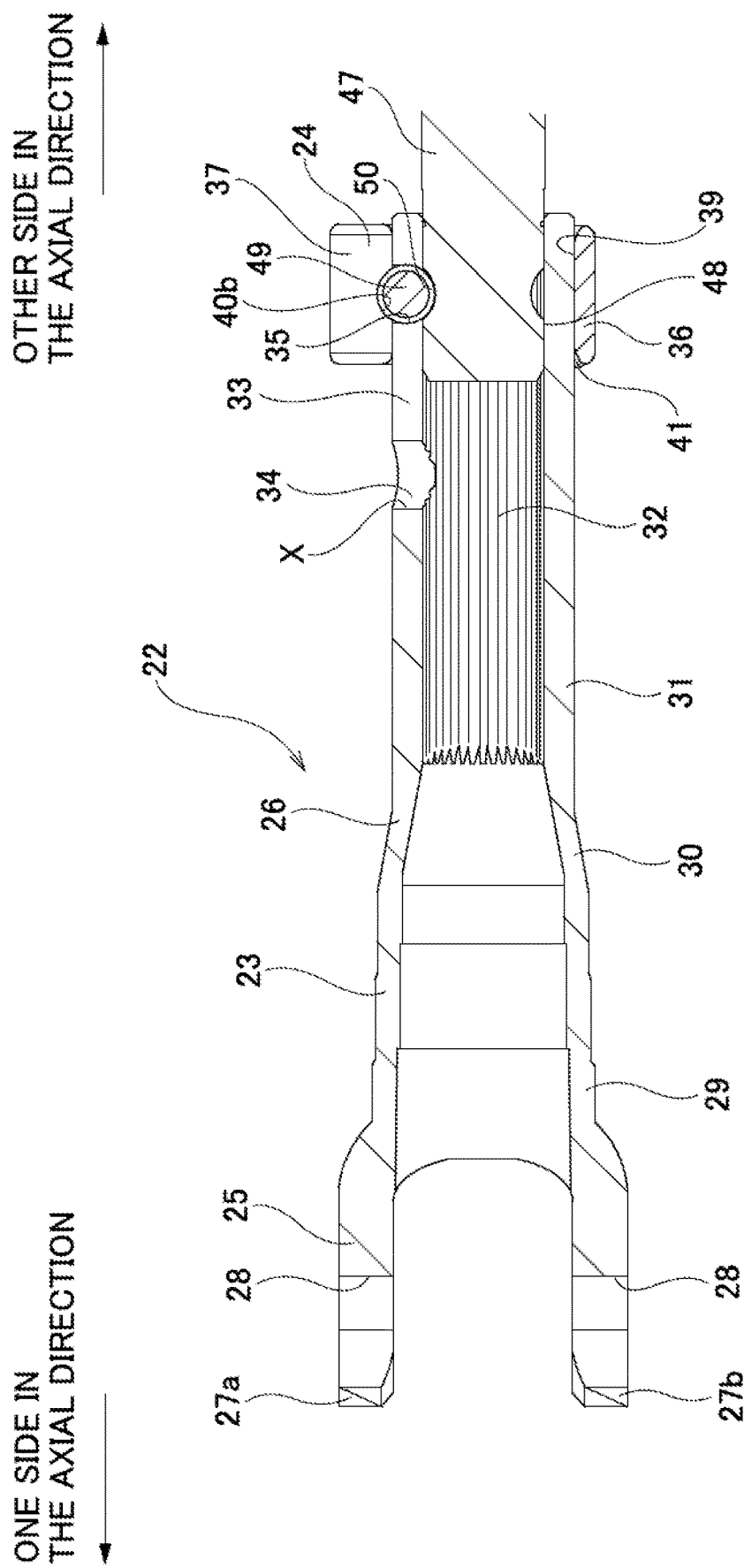
FIG. 8 is a cross-sectional view illustrating a connected state between the torque transmission shaft and the shaft connected to the torque transmission shaft according to the first example.

The small-diameter cylindrical portion 31 has a cylindrical shape and is arranged in a range from the middle portion in the axial direction to the other end portion in the axial direction of the shaft 23. The outer peripheral surface of the small-diameter cylindrical portion 31 has a cylindrical surface shape, the outer diameter of which does not change in the axial direction, whereas the inner peripheral surface of the small-diameter cylindrical portion 31 includes a female serration 32 over the entire length thereof. As illustrated in FIGS. 7 and 8, the end portion of a shaft 47 such as a steering shaft, a pinion shaft or the like is inserted inside the small-diameter cylindrical portion 31, and a male serration 48 that is provided on the outer peripheral surface of the shaft 47 engages with the female serration 32 with a serration engagement.

The small-diameter cylindrical portion 31 is provided with a slit 33 extending in the axial direction in a portion coinciding with a position in the circumferential direction (phase) of one arm portion 27a of the yoke portion 25. The slit 33 allows the inner peripheral surface and the outer peripheral surface of the small-diameter cylindrical portion 31 to communicate with each other. One end portion of the slit 33 in the axial direction, or in other words, the deepest end portion X, is located at a middle portion in the axial direction of the small-diameter cylindrical portion 31, and the other end edge portion in the axial direction of the slit 33 is open to the other end edge in the axial direction of the small-diameter cylindrical portion 31 (shaft 23). A stress relieving portion 34 having a width dimension that is larger than the adjacent portion located on the other side in the axial direction thereof and having a substantially circular opening shape in a planar view (refer to FIG. 5) is provided at the deepest end portion X of the slit 33. By providing the slit 33 at the other end portion in the axial direction of the shaft 23 in this way, the other end portion in the axial direction of the shaft 23 (the other half portion in the axial direction of the small-diameter cylindrical portion 31) may be reduced in diameter. In addition, by providing the stress relieving portion 34 at the deepest end portion X of the slit 33, damage such as a cracking or the like may be prevented from occurring at the deepest end portion X of the slit 33 where stress tends to concentrate when the shaft 23 is reduced in diameter.

The shaft 23 is further provided with an engaging concave groove 35 that extends in a direction orthogonal to the center axis of the shaft 23 at a portion of the outer peripheral surface of a portion near the other end in the axial direction of the small-diameter cylindrical portion 31 that coincides with the position in the circumferential direction of the one arm portion 27a of the yoke portion 25. In other words, the engaging concave groove 35 is formed so as to intersect the slit 33. The intersection between the engaging concave groove 35 and the slit 33 is a wide portion having a larger width dimension than the portions of the slit 33 adjacent to both sides of the intersection in the axial direction. The engaging concave groove 35 is formed in a partial cylindrical surface shape, and has a radius of curvature substantially equal to the radius of curvature of the installation hole 40a (40b) provided in the clamp 24.

The clamp 24 is externally fitted around the other end portion in the axial direction of the shaft 23, and has a function of reducing the diameter of the other end portion in the axial direction of the shaft 23. More specifically, the clamp 24 is externally fitted around the other end portion in the axial direction of the small-diameter cylindrical portion 31 of the shaft 23, and reduces the diameter of the other half portion in the axial direction of the small-diameter cylindrical portion 31. The clamp 24 is formed by subjecting a raw material such as S35C, which is a carbon steel for machine structures, having a higher hardness than the material of the shaft 23, to processing such as hot forging, cutting or the like, or is formed by subjecting a raw material such as S10C or S15C, which is a carbon steel for machine structures, to cold forging that causes work hardening.

The clamp 24 has a partial cylindrical shape (substantially U-shaped) as a whole, and has a base portion 36 having a semi-cylindrical shape, a pair of flange portions 37 respectively having a substantially plate shape that are arranged at both end portions in the circumferential direction of the base portion 36, and a non-continuous portion 38 that is provided at one location in the circumferential direction positioned between the pair of flange portions 37. In other words, the pair of flange portions 37 is arranged on both sides of the non-continuous portion 38. In a state in which the clamp 24 is fixed to the other end portion in the axial direction of the shaft 23, the positions in the circumferential direction of the non-continuous portion 38 and the slit 33 of the shaft 23 coincide with each other. In this example, the width of the non-continuous portion 38 of the clamp 24 in the free state and the width of the slit 33 of the shaft 23 (small-diameter cylindrical portion 31) in the free state are the same as each other. In addition, the thickness of the pair of flange portions 37 is the same.

The clamp 24 has an insertion hole 39 into which the small-diameter cylindrical portion 31 of the shaft 23 is inserted. The insertion hole 39 has a partial cylindrical surface configured by the inner peripheral surface of the base portion 36 and the inner surfaces in the radial direction of the pair of flange portions 37. The inner diameter dimension of the insertion hole 39 of the clamp 24 in the free state is equal to or slightly larger than the outer diameter dimension of the small-diameter cylindrical portion 31 in the free state.

The pair of flange portions 37 is provided with coaxial installation holes 40a, 40b at portions that are aligned with each other. Each of the installation holes 40a, 40b is provided at a position skewed with respect to the center axis of the insertion hole 39, and opens to the insertion hole 39. Moreover, of the pair of installation holes 40a, 40b, one installation hole 40a is a through hole, and the other installation hole 40b is a screw hole. In a state in which the clamp 24 is fixed to the other end portion in the axial direction of the shaft 23, the engaging concave groove 35 is arranged at a position facing the portions of the pair of installation hole 40a, 40b that open to the insertion hole 39.

In this example, in a state before the clamp 24 is welded and fixed to the other end portion in the axial direction of the shaft 23, a tightening bolt 49 as a tightening member is inserted inside the pair of installation holes 40a, 40b, and arranged inside the engaging concave groove 35. Specifically, a portion near the base end of the tightening bolt 49 is inserted into the one installation hole 40a, which is a through hole, and an intermediate portion of the tightening bolt 49 is arranged inside the engaging concave groove 35. In this state, the tip end portion of the tightening bolt 49 is screwed into the other installation hole 40b, which is a screw hole, only slightly, or in other words, just to an extent that the small-diameter cylindrical portion 31 is not reduced in diameter. With this kind of a configuration, the engaging concave groove 35, and the tightening bolt 49 that is supported at both end portions with respect to the clamp 24 engage with a key engagement, so positioning in the axial direction of the shaft 23 and the clamp 24 may be performed. Moreover, relative rotation between the shaft 23 and the clamp 24 may be prevented.

In this example, the shaft 23 and the clamp 24 are fixed together by welding. More specifically, by forming a weld portion 41 by spot welding at one location in the circumferential direction on the opposite side of the slit 33 in the diametric direction of the shaft 23 of a portion between the opening edge on the one side in the axial direction of the insertion hole 39 of the clamp 24 and the outer peripheral surface of the shaft 23, the shaft 23 and the clamp 24 are welded and fixed together. In this example, the welded portion 41 is formed in a portion of the shaft 23 on the opposite side from the slit 33 in the diametric direction, so it is possible to prevent the amount of bending of the pair of flange portions 37 during clamping from being affected due to the formation of the weld portion 41 (it is possible to prevent the balance of the amount of bending from deteriorating).

In order to manufacture the torque transmission shaft 22 having a configuration such as described above, first, the other end portion in the axial direction of the shaft 23 is inserted into the insertion hole 39 of the clamp 24 from the one side in the axial direction. At this time, in order to perform positioning (phase alignment) in the circumferential direction of the shaft 23 and the clamp 24, the circumferential positions of the non-continuous portion 38 of the clamp 24 and the slit 33 of the shaft 23 are aligned with each other, and for example, a plate-shaped phase aligning member is inserted on the inner side of the non-continuous portion 38 and the slit 33. Next, the shaft 23 and the clamp 24 are moved relative to each other in the axial direction until the positions in the axial direction of the pair of installation holes 40a, 40b and the engaging concave groove 35 are aligned. Next, by arranging the tightening bolt 49 inside the pair of installation holes 40a, 40b and the engaging concave groove 35, positioning of the shaft 23 and the clamp 24 in the axial direction is achieved, and at the same time, relative rotation between the shaft 23 and the clamp 24 is prevented. Finally, the shaft 23 and the clamp 24 are fixed together by welding.

In a state in which the torque transmission shaft 22 is being used, the yoke portion 25 that is arranged at the one end portion in the axial direction of the torque transmission shaft 22 is combined with another yoke and a cross shaft (not illustrated). In this way, the torque transmission shaft 22 is connected to a shaft such as an intermediate shaft or the like provided with another yoke so as to be capable of transmitting torque. On the other hand, a shaft 47 such as a steering shaft, a pinion shaft or the like is inserted inside the small-diameter cylindrical portion 31, and the male serration 48 that is formed on the outer peripheral surface of the shaft 47 engages with the female serration 32 that is formed on the inner peripheral surface of the small-diameter cylindrical portion 31. Accordingly, relative rotation between the torque transmission shaft 22 and the shaft 47 is prevented. Moreover, the middle portion of the tightening bolt 49 passes through a wide portion at the intersecting portion of the engaging concave groove 35 and the slit 33 and enters inside the annular concave groove 50 that is arranged so as to cross the male serration 48 on the outer peripheral surface on the tip end portion of the shaft 47, and engaging the annular concave groove 50 engages with the tightening bolt 49 with a key engagement. This prevents the shaft 47 and the torque transmission shaft 22 from moving relative to each other in the axial direction. Furthermore, by increasing the amount that the tightening bolt 49 is screwed into the other installation hole 40b, the width dimension of the non-continuous portion 38 is reduced, and the diameter of the small-diameter cylindrical portion 31 is reduced, so the outer peripheral surface of the shaft 47 is strongly tightened by the inner peripheral surface of the small-diameter cylindrical portion 31. In this way, the torque transmission shaft 22 and the shaft 47 such as a steering shaft, a pinion shaft or the like are coupled so as to be able to transmit torque.

With the torque transmission shaft 22 of this example, whirling of a shaft connected to the torque transmission shaft 22 may be suppressed. In other words, in the torque transmission shaft 22 of this example, the clamp 24 is not integrated with the shaft 23, but is welded and fixed to the shaft 23. Therefore, coaxiality between the yoke portion 25 and the female serration 32 arranged at both end portions in the axial direction of the shaft 23 may be maintained at a high degree. Furthermore, the shaft 23 and the yoke portion 25 are not welded and fixed as separate bodies, but are formed integrally. Therefore, the coaxiality of the yoke portion 25 with respect to the shaft 23 (cylindrical portion 26) may be maintained at a high degree without being affected by thermal deformation during welding. Accordingly, whirling of the shaft connected to the yoke portion 25 and the shaft 47 connected to the female serration 32 may be suppressed. As a result, in a part of the steering apparatus, generation of abnormal noise (sliding noise, stick-slip vibration noise, and the like in the direction of rotation) due to whirling of the shaft is prevented. Moreover, the shaft 23 is hollow, so the weight of the torque transmission shaft 22 as a whole is reduced.

Second Example

Figure 9:
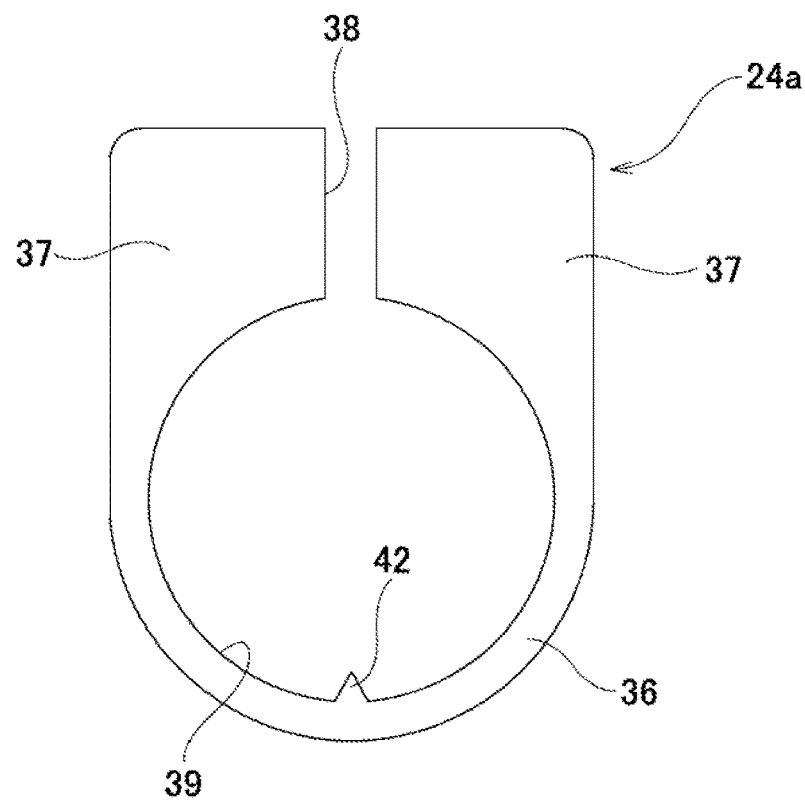
FIG. 9 is a cross-sectional view illustrating a clamp of a torque transmission shaft according to a second example of an embodiment of the present invention.
Figure 10:
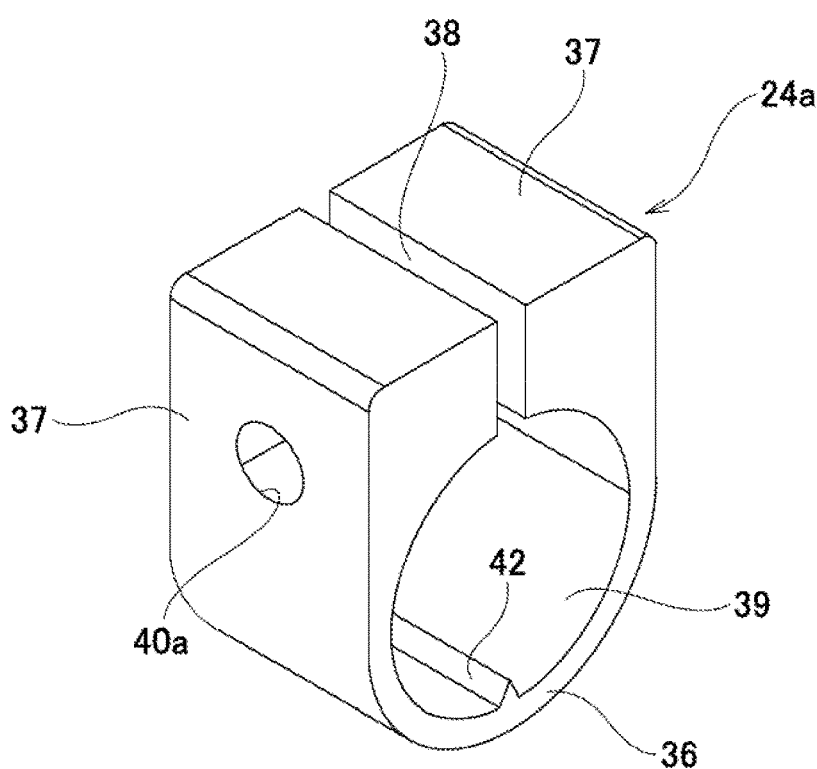
FIG. 10 is a perspective view illustrating the clamp of the torque transmission shaft according to the second example.

A second example of an embodiment of the present invention will be described with reference to FIGS. 9 and 10.

In this example, the clamp 24a has a projecting portion 42 that projects inward in the radial direction on a part of the inner peripheral surface of the insertion hole 39. The projecting portion 42 has a function of preventing the clamp 24a from rotating relative to the shaft 23 (refer to FIG. 1) in a state before the clamp 24a is fixed by welding to the other end portion in the axial direction of the shaft 23.

The projecting portion 42 has a substantially triangular cross-sectional shape, and is arranged at a portion of the inner peripheral surface of the insertion hole 39 that is opposite to the non-continuous portion 38 of the insertion hole 39 in the diametric direction. The projecting portion 42 extends in the axial direction over the entire width of the insertion hole 39.

In this example, before the other end portion in the axial direction of the shaft 23 is inserted (press-fitted) inside the insertion hole 39 of the clamp 24a, positioning in the circumferential direction of the shaft 23 and the clamp 24a is performed. Then, when the other end portion in the axial direction of the shaft 23 is inserted inside the insertion hole 39, at least the tip end portion of the projecting portion 42 bites into the outer peripheral surface of the shaft 23. This prevents the shaft 23 and the clamp 24a from rotating relative to each other in a state before welding and fixing. In this example, the projecting portion 42 is arranged in a portion on the opposite side from the non-continuous portion 38, so when the other end portion in the axial direction of the shaft 23 is inserted inside the insertion hole 39, the presence of the projecting portion 42 prevents the diameter of the clamp 24a from expanding. Therefore, the projecting portion 42 may effectively bite into the outer peripheral surface of the shaft 23. Other configurations and operational effects, including that the shaft 23 and the clamp 24a are fixed by welding, are the same as those of the first example.

Third Example

Figure 11:
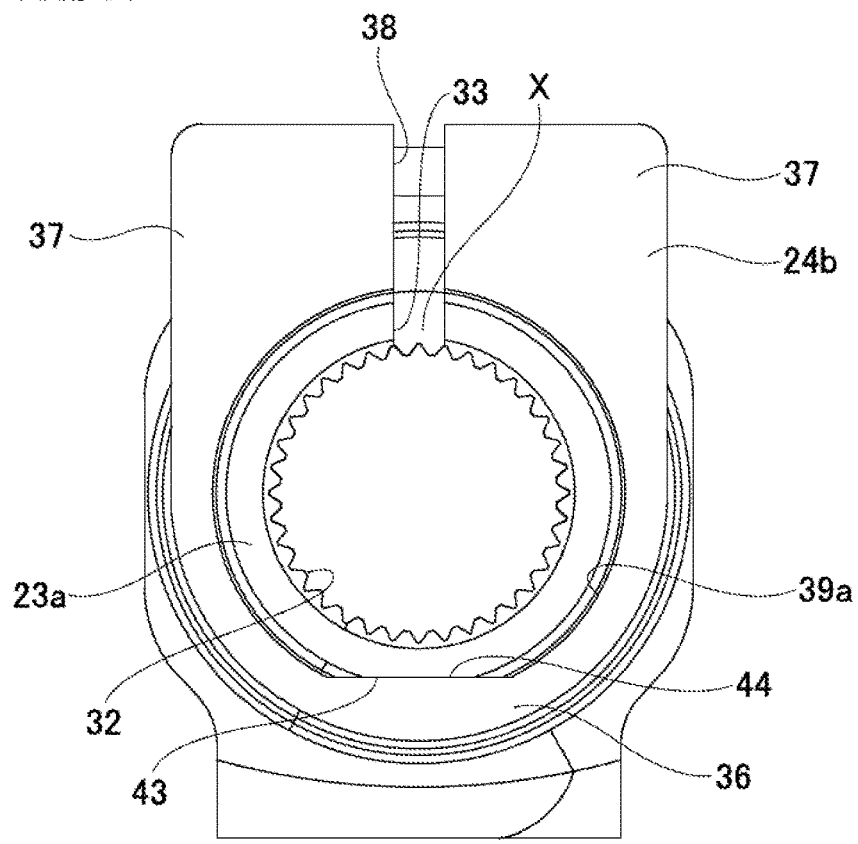
FIG. 11 is an end view illustrating a torque transmission shaft according to a third example of an embodiment of the present invention, as viewed from the other side in the axial direction.
Figure 12:
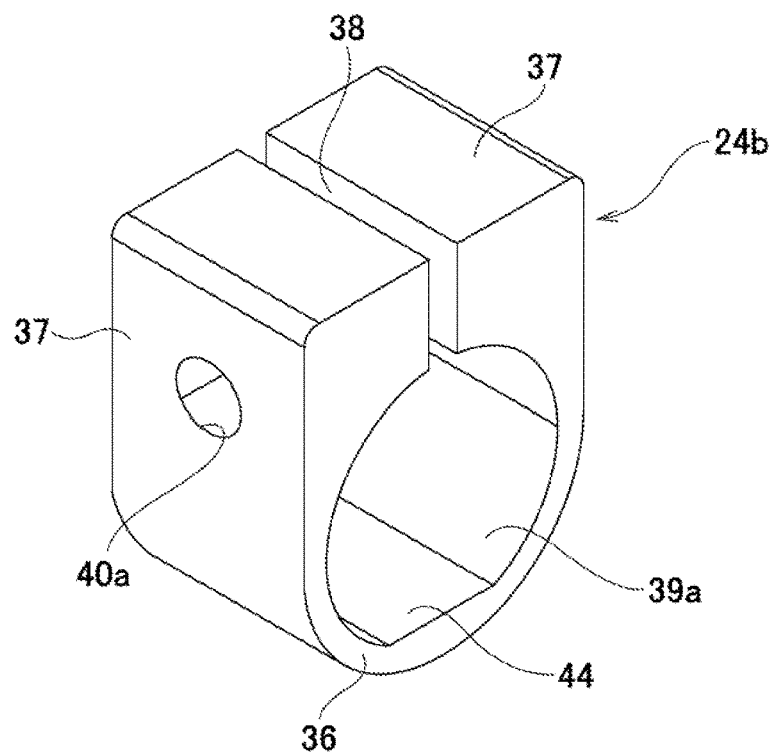
FIG. 12 is a perspective view illustrating a clamp of the torque transmission shaft according to the third example.

A third example of an embodiment of the present invention will be described with reference to FIGS. 11 and 12. In this example, in order to prevent the clamp 24b from rotating relative to the shaft 23a in a state before the clamp 24b is fixed by welding to the other end portion in the axial direction of the shaft 23a, the outer peripheral surface of the shaft 23a and the inner peripheral surface of the insertion hole 39a of the clamp 24b are fixed together by a non-circular fit.

The shaft 23a has a flat surface shaped shaft-side flat surface portion 43 at a portion of the outer peripheral surface of the other end portion in the axial direction that is on the opposite side from the slit 33 in the diametric direction of the shaft 23a. Accordingly, the contour shape of the outer peripheral surface of the other end portion in the axial direction of the shaft 23a is substantially D-shaped and includes an arc portion and a straight portion. The clamp 24b has a flat surface shaped clamp-side flat surface portion 44 at a portion of the inner peripheral surface of the insertion hole 39a that is on the opposite side from the non-continuous portion 38 in the diametric direction of the insertion hole 39a. Accordingly, the contour shape of the inner peripheral surface of the insertion hole 39a of the clamp 24b is also substantially D-shaped and includes an arc portion and a straight portion.

In this example, when the other end portion in the axial direction of the shaft 23a is inserted inside the insertion hole 39a of the clamp 24b, the shaft-side flat surface portion 43 and the clamp-side flat surface portion 44 come in surface contact with each other. Thus, the outer peripheral surface of the shaft 23a and the inner peripheral surface of the insertion hole 39a of the clamp 24b are fitted together by a non-circular fit, and relative rotation between the shaft 23a and the clamp 24b is prevented. The other configurations and operational effects, including that the shaft 23 and the clamp 24a are fixed together by welding, are the same as those of the first example.

Fourth Example

Figure 13:
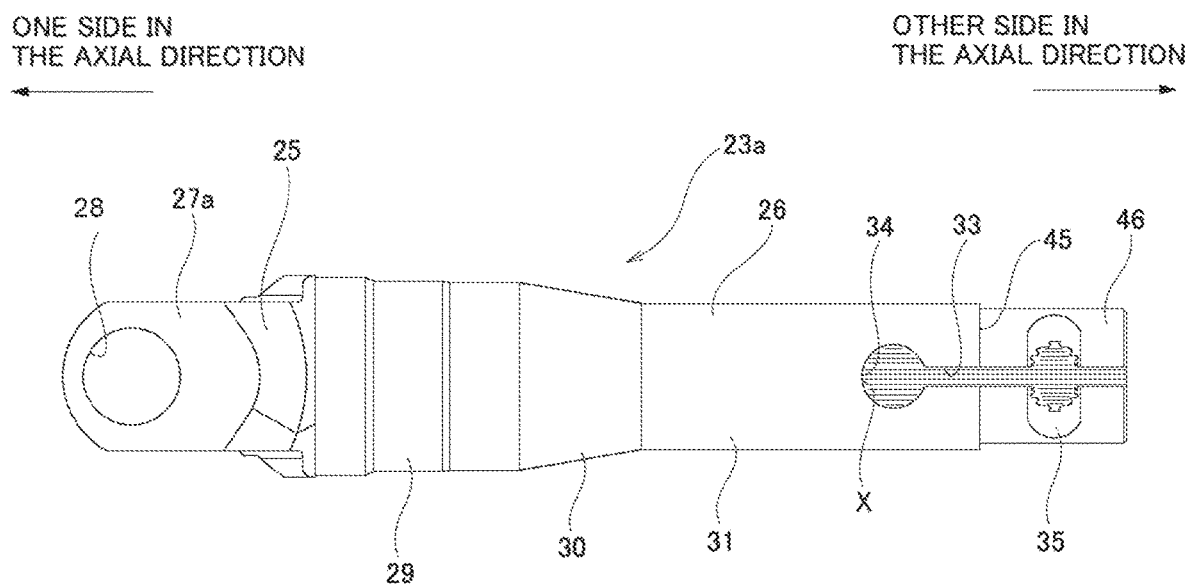
FIG. 13 is a plan view illustrating a shaft of a torque transmission shaft according to a fourth example of an embodiment of the present invention.

A fourth example of an embodiment of the present invention will be described with reference to FIG. 13. In this example, the shaft 23a has a substantially annular (C-shaped) step surface 45 facing toward the other side in the axial direction at a portion near the other end in the axial direction of the outer peripheral surface (a middle portion in the axial direction of the outer peripheral surface of the small-diameter cylindrical portion 31). More specifically, a fitting cylindrical portion 46 having an outer diameter dimension that is smaller than that of a portion adjacent on the one side in the axial direction is provided at the other end portion in the axial direction of the small-diameter cylindrical portion 31, and the step surface 45 is arranged at one end portion in the axial direction of the fitting cylindrical portion 46. In this example, the fitting cylindrical portion 46 is formed by performing cutting on the outer peripheral surface of the other end portion in the axial direction of the small-diameter cylindrical portion 31. When the clamp 24 (refer to FIG. 1) is externally fitted to the fitting cylindrical portion 46, the end surface in the axial direction on the one side of the clamp 24 abuts against the step surface 45, thereby positioning the clamp 24 with respect to the shaft 23b in the axial direction. The other configurations and operational effects, including that the shaft 23b and the clamp 24 are fixed together by welding, are the same as those of the first example.

Fifth Example

A fifth example of an embodiment will be described with reference to FIGS. 14 to 17. In this example, the cylindrical portion 26a of the shaft 23c includes, in order from the one side in the axial direction, a large-diameter cylindrical portion 29a, a large-diameter side cylindrical cone portion 51, a medium-diameter cylindrical portion 52, a small-diameter side cylindrical cone portion 53, and a small-diameter cylindrical portion 31a.

The large-diameter cylindrical portion 29a is arranged at the one end portion in the axial direction of the cylindrical portion 26a. The other end edge in the axial direction of the large-diameter cylindrical portion 29a is connected to the one end edge in the axial direction of the large-diameter side cylindrical cone portion 51. Moreover, the outer diameter dimension and the inner diameter dimension of the large-diameter cylindrical portion 29a are larger than the outer diameter dimension and the inner diameter dimension of the other portions of the cylindrical portion 26a that exist on the other side in the axial direction of the large-diameter cylindrical portion 29a. In other words, the large-diameter cylindrical portion 29a has the largest outer diameter dimension and inner diameter dimension of the cylindrical portion 26a.

The large-diameter side cylindrical cone portion 51 has a partial conical cylindrical shape in which the outer diameter dimension and the inner diameter dimension decrease going toward the other side in the axial direction, and the other end edge in the axial direction of the large-diameter side cylindrical cone portion 51 is connected to the one end edge in the axial direction of the medium-diameter cylindrical portion 52.

The medium-diameter cylindrical portion 52 is arranged at a middle portion in the axial direction of the cylindrical portion 26a. The outer diameter dimension and the inner diameter dimension of the medium-diameter cylindrical portion 52 are constant in the axial direction. In addition, the other end edge in the axial direction of the medium-diameter cylindrical portion 52 is connected to the one end edge in the axial direction of the small-diameter side cylindrical cone portion 53.

The small-diameter side cylindrical cone portion 53 has a partial conical cylindrical shape in which the outer diameter dimension and the inner diameter dimension decrease going toward the other side in the axial direction. The other end edge in the axial direction of the small-diameter side cylindrical cone portion 53 is connected to the one end edge in the axial direction of the small-diameter cylindrical portion 31a.

The small-diameter cylindrical portion 31a is arranged at the other end portion in the axial direction of the cylindrical portion 26a, and has a substantially cylindrical shape. The small-diameter cylindrical portion 31a is formed by performing drawing on the other end portion in the axial direction of the cylindrical portion 26a. The outer diameter dimension and the inner diameter dimension of the small-diameter cylindrical portion 31a are smaller than the outer diameter dimension and the inner diameter dimension of the other portions of the cylindrical portion 26a that exist on the one side in the axial direction of the large-diameter cylindrical portion 29a. In other words, the small-diameter cylindrical portion 31a has the smallest outer diameter dimension and inner diameter dimension of the cylindrical portion 26a.

A step surface 45 having a substantially annular shape (C shape) facing toward the other side in the axial direction is provided in the middle portion in the axial direction of the outer peripheral surface of the small-diameter cylindrical portion 31a. Therefore, in this example, by abutting the clamp 24 against the step surface 45, the clamp 24 may be positioned in the axial direction with respect to the shaft 23c. Accordingly, when fixing the shaft 23c and the clamp 24 together by welding, it is not necessary to arrange the tightening bolt 49 inside the engaging concave groove 35. In the present example, similar to the structure of the first example, by forming a weld portion 41 by spot welding at one location in the circumferential direction of the portion between the opening edge on the one side in the axial direction of the insertion hole 39 of the clamp 24 and the outer peripheral surface of the shaft 23c that is on the opposite side from the slit 33a in the diametric direction of the shaft 23c, the shaft 23c and the clamp 24 are fixed together by welding.

Figure 14:
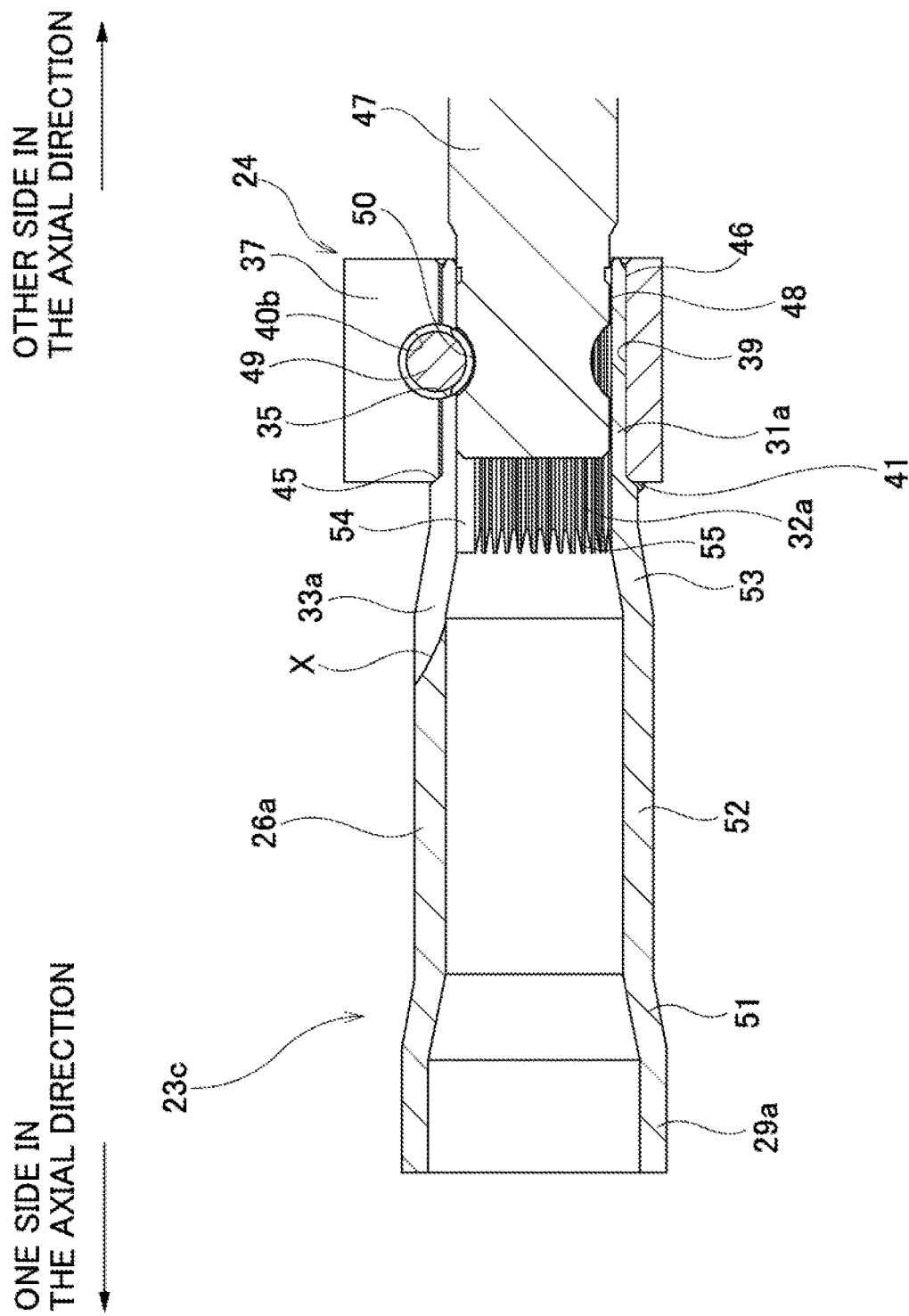
FIG. 14 is a cross-sectional view illustrating a connected state between a torque transmission shaft and a shaft connected to the torque transmission shaft according to a fifth example of an embodiment of the present invention.
Figure 15:
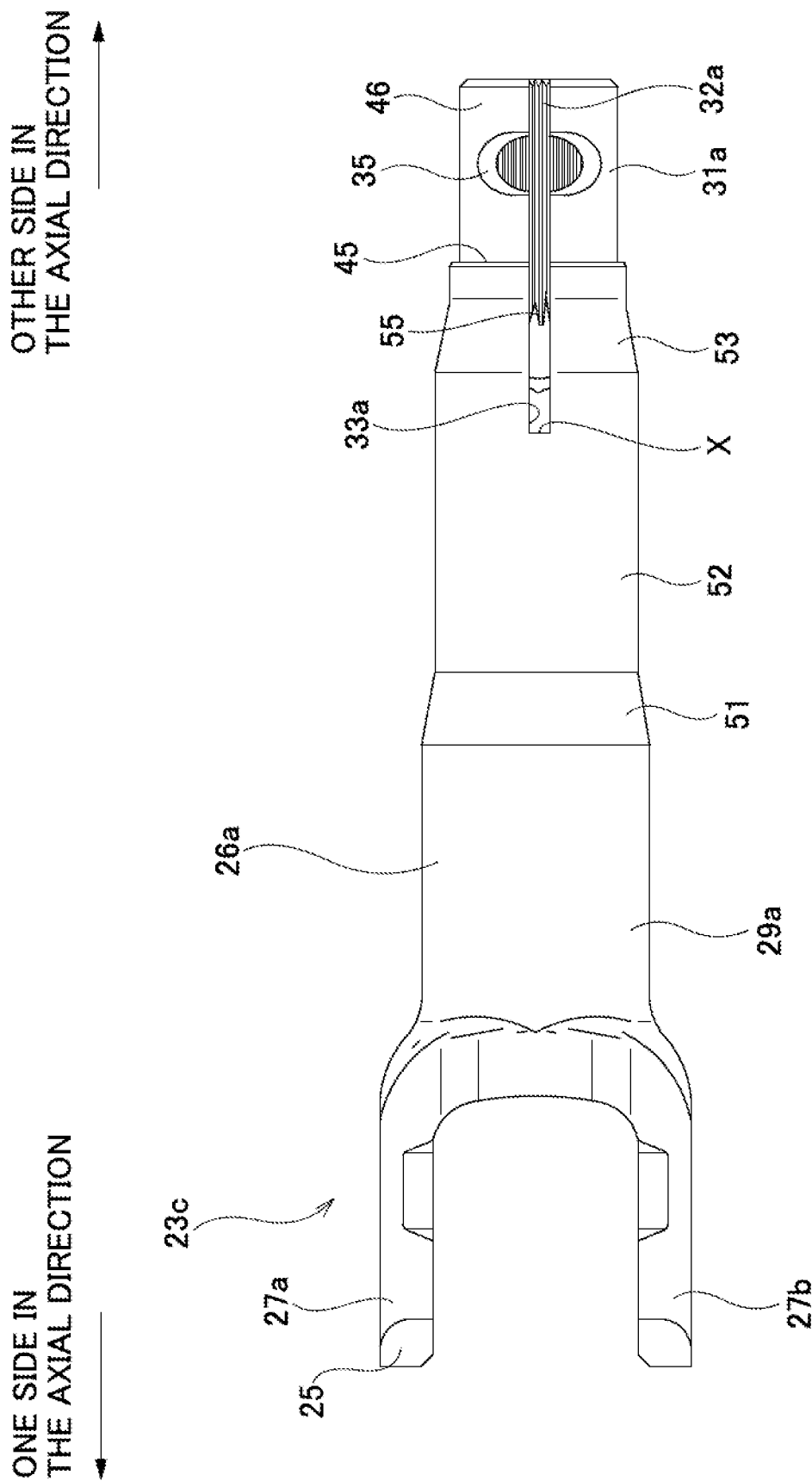
FIG. 15 is a plan view illustrating a shaft of the torque transmission shaft according to the fifth example.

A female serration 32a is provided on the inner peripheral surface of the small-diameter cylindrical portion 31a and extends over the entire length of the small-diameter cylindrical portion 31a. In this example, of the inner peripheral surface of the cylindrical portion 26a, the female serration 32a is provided only on the inner peripheral surface of the small-diameter cylindrical portion 31a. The female serration 32a has, at one end portion in the axial direction, an incomplete serration portion 55 in which the groove depth (inner diameter dimension) of the female serration grooves of the female serration 32a decreases going toward the one side in the axial direction. As illustrated in FIG. 14, the end portion of a shaft 47 such as a steering shaft, a pinion shaft or the like is inserted inside the small-diameter cylindrical portion 31a, and a male serration 48 that is provided on the outer peripheral surface of the shaft 47 engages with the female serration 32a with a serration engagement. However, of the female serration 32a, the incomplete serration portion 55 has a structure that does not smoothly engage with the male serration 48. In the present example, the step surface 45 is arranged in a middle portion in the axial direction of the outer peripheral surface of the small-diameter cylindrical portion 31a, so by abutting the clamp 24 against the step surface 45, the clamp 24 is positioned in the axial direction with respect to the shaft 23c; and in this state, the incomplete serration portion 55 is positioned farther on the one side in the axial direction than the one end surface in the axial direction of the clamp 24. Furthermore, the weld portion 41 is located in the axial direction between the incomplete serration portion 55 and the one end surface in the axial direction of the shaft 47. Therefore, the portion of the female serration 32a that engages with the male serration 48 of the shaft 47 in a serration engagement is prevented from being thermally deformed by welding, so that the clamp 24 and the shaft 47 may be smoothly coupled.

In the present example, a slit 33a that extends in the axial direction is provided in a range from the medium-diameter cylindrical portion 52 to the small-diameter cylindrical portion 31a, which is located from the middle portion in the axial direction to the other end portion in the axial direction of the cylindrical portion 26a as described above. The deepest end portion X, which is the one end portion in the axial direction of the slit 33a, is positioned at the other end portion in the axial direction of the medium-diameter cylindrical portion 52 located farther on the one side in the axial direction than the small-diameter cylindrical portion 31a; and the other end edge portion in the axial direction of the slit 33a opens to the other end edge in the axial direction of the small-diameter cylindrical portion 31a (shaft 23c). A portion on the one side in the axial direction of the slit 33a, which is a portion adjacent to the other side in the axial direction of the deepest end portion X, is located in the small-diameter side cylindrical cone portion 53. Therefore, the female serration 32a is not provided on the inner peripheral surface of the portion of the cylindrical portion 26a where the deepest end portion X of the slit 33a is located. Accordingly, the deepest end portion X of the slit 33a is located farther on the one side in the axial direction than the one end edge in the axial direction of the female serration 32a.

Figure 16:
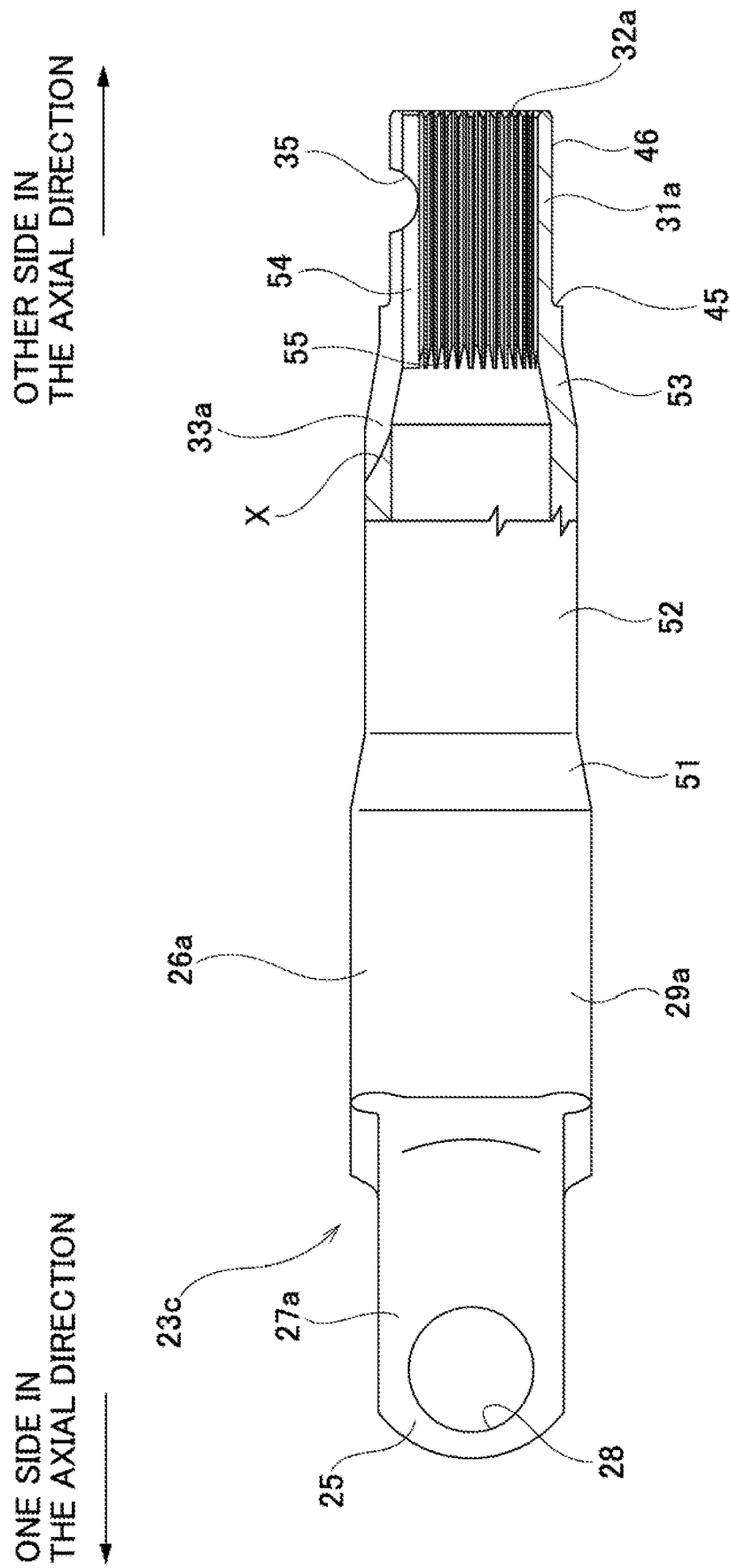
FIG. 16 is a partial cross-sectional view illustrating the shaft of the torque transmission shaft according to the fifth example.
Figure 17:
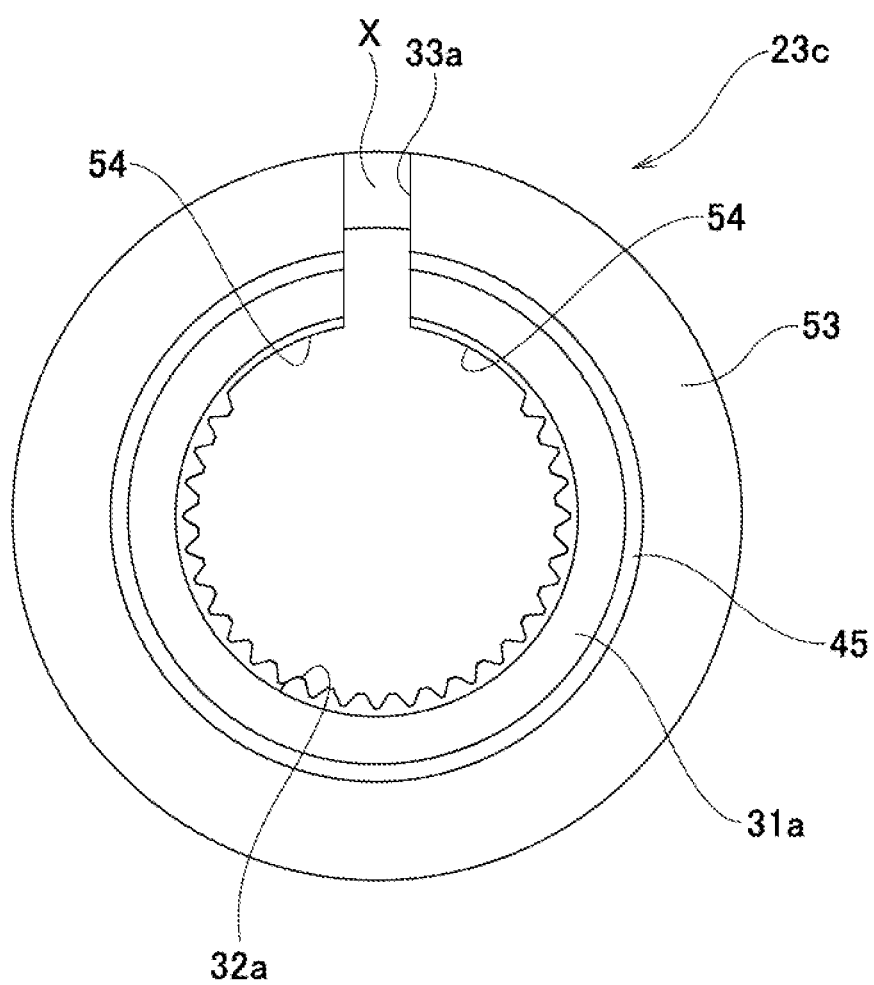
FIG. 17 is an end view illustrating the shaft of the torque transmission shaft according to the fifth example, as viewed from the other side in the axial direction.

In the present example, the stress relieving portion 34 (refer to FIG. 1 and the like) is not provided at the deepest end portion X of the slit 33a, and the width dimension of the slit 33a in the circumferential direction is constant over the entire length. This kind of slit 33a is formed by cutting using a rotary cutting tool such as a cutter or the like. Therefore, as illustrated in FIG. 16, the cross-sectional shape of the deepest end portion X (the one end edge in the axial direction) of the slit 33a is a partial arc shape. However, a stress relieving portion 34 having a larger width dimension than the portion adjacent to the other side in the axial direction may be provided at the deepest end portion X of the slit 33a. Moreover, the slit 33a is arranged at a position where the phase is shifted by 90 degrees from the pair of arm portions 27a, 27b of the yoke portion 25.

In this example, a toothless portion 54 in which the female serration 32a is not formed is provided in portions of the inner peripheral surface of the small-diameter cylindrical portion 31a adjacent to both sides of the slit 33a in the circumferential direction. In other words, the toothless portion 54 has a partial cylindrical surface having an inner diameter dimension that is mostly the same as the inscribed circle diameter of the valley portions of the female serration 32a.

In this example, the deepest end portion X of the slit 33a is located in the medium-diameter cylindrical portion 52 having an outer diameter dimension and an inner diameter dimension that is larger than that of the small-diameter cylindrical portion 31a, so when the other end portion in the axial direction of the shaft 23c is reduced in diameter, the stress generated in the deepest end portion X of the slit 33a may be made smaller than in a case where the deepest end portion is located in the small-diameter cylindrical portion 31a. Furthermore, the female serration 32a does not exist on the one side in the axial direction of the deepest end portion X of the slit 33a, so a state in which the deepest end portion X of the slit 33a and the valley portions of the female serration 32a are continuous in the axial direction (the intersections with the valley portions of the female serration 32a in the deepest end portion X become thin) is prevented. For this reason, stress concentration at the deepest end portion X of the slit 33a may be reduced. In addition, in this example, processing for forming the stress relieving portion at the deepest end portion X of the slit 33a may be omitted, so the processing cost of the slit 33a may be reduced. Furthermore, it is not necessary to perform a deburring process on the deepest end portion of the slit 33a, so the processing cost may be reduced from this aspect as well.

In the present example, the toothless portions 54 are provided at portions of the inner circumferential surface of the small-diameter cylindrical portion 31a located on both sides of the slit 33a in the circumferential direction, so when the other end portion in the axial direction of the shaft 23c is reduced in diameter, the male serration 48 provided on the outer peripheral surface of the shaft 47 may be prevented from local contact. For this reason, the occurrence of cracks or chipping of the serration teeth due to excessive stress concentration, which may become a problem when the female serrations are provided on both sides in the circumferential direction of the slit 33a, may be prevented.

In the shaft 23c of the present example, the cylindrical portion 26a has a three-stage structure including a small-diameter cylindrical portion 31a, a medium-diameter cylindrical portion 52, and a large-diameter cylindrical portion 29a. Therefore, the work of forming the shaft 23c by forging a metal material may be performed more easily than in a case of forming a shaft 23 in which the cylindrical portion 26 has a two-stage structure including a small-diameter cylindrical portion 31 and a large-diameter cylindrical portion 29 such as in the first example.

In the shaft 23c of this example, the cylindrical portion 26 has a three-stage structure, and the female serration 32a is provided only on the inner peripheral surface of the small-diameter cylindrical portion 31a. Therefore, in the case of the shaft 23c of the present example, the length of the female serration 32a in the axial direction may be made shorter than in the case of the shaft 23 in which the cylindrical portion 26a has two-stage structure and the female serration 32a is provided on the inner peripheral surface of the small-diameter cylindrical portion 31a of the cylindrical portion 26a along the axial direction as in the first example. Accordingly, in the shaft 23c of the present example, the processing cost when forming the female serration 32a by broaching, pressing, or the like may be kept lower than that of the shaft 23 in the first example. The other configurations and operational effects are the same as those of the first example.

Sixth Example

Figure 18:
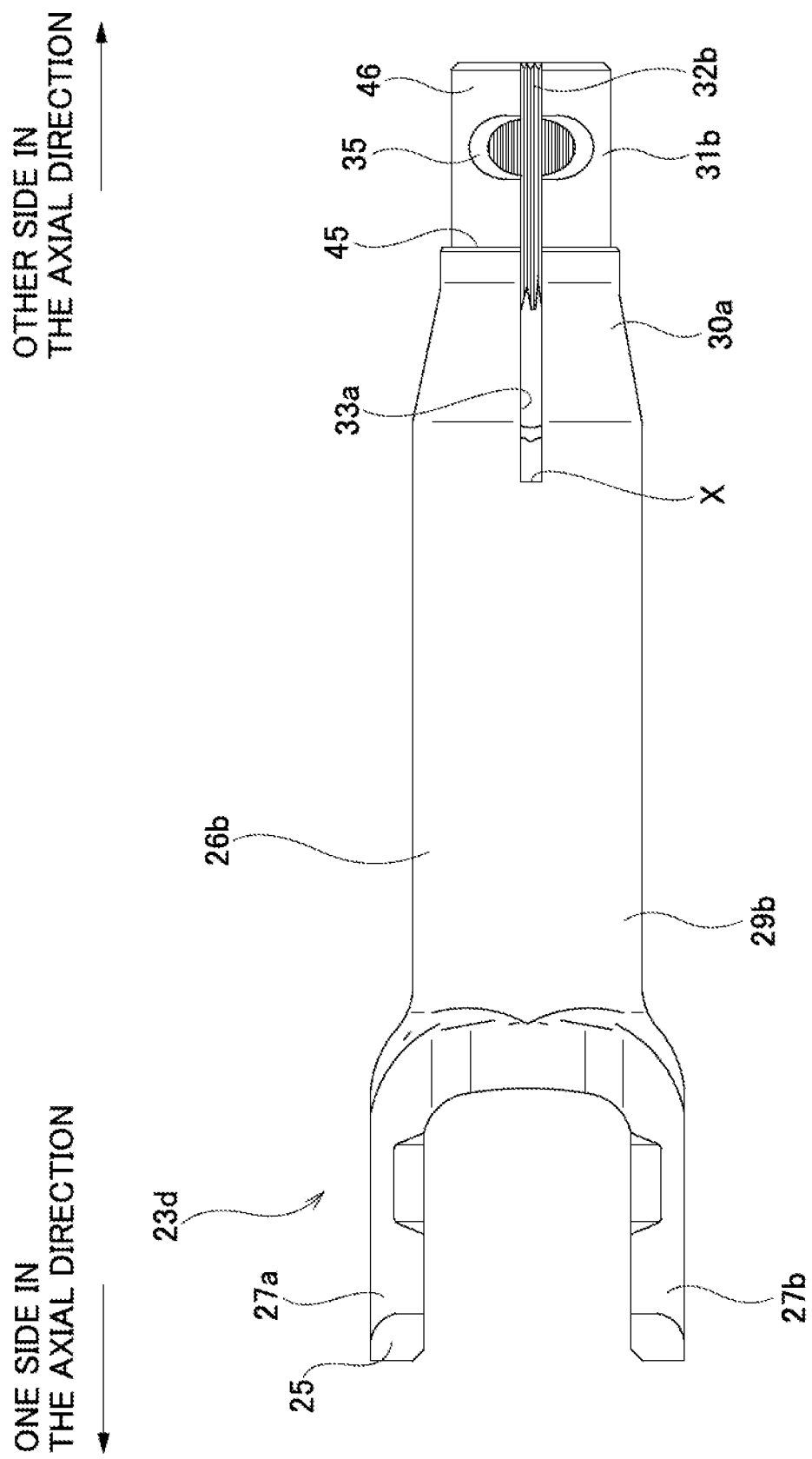
FIG. 18 is a plan view illustrating a shaft of a torque transmission shaft according to a sixth example of an embodiment of the present invention.

A sixth example of an embodiment of the present invention will be described with reference to FIG. 18. In this example, the cylindrical portion 26b of the shaft 23d has a two-stage structure in which a small-diameter cylindrical portion 31b and a large-diameter cylindrical portion 29b are connected by a conical cylindrical portion 30a. However, in the shaft 23d of the present example, the length of the small-diameter cylindrical portion 31b in the axial direction is shorter than the length of the small-diameter cylindrical portion 31 in the axial direction of the shaft 23 in the first example. In other words, in the shaft 23d, the position of the conical cylindrical portion 30a in the axial direction is farther on the other side in the axial direction than the position of the conical cylindrical portion 30 in the axial direction in the shaft 23 of the first example. In this way, the length in the axial direction of the female serration 32b that is formed on the inner peripheral surface of the small-diameter cylindrical portion 31b is shorter than the length in the axial direction of the female serration 32 in the first example, and the processing cost for forming the female serration 32b is reduced.

Note that in the shaft 23d of the present example, the deepest end portion X, which is the one end portion in the axial direction of the slit 33a, is positioned at the other end portion in the axial direction of the large-diameter cylindrical portion 29b. In other words, a portion of the slit 33a on the one side in the axial direction, which is a portion adjacent to the other side in the axial direction of the deepest end portion X is positioned in the conical cylindrical portion 30a. In addition, a substantially annular step surface 45 facing toward the other side in the axial direction exists at a middle portion in the axial direction of the outer peripheral surface of the small-diameter cylindrical portion 31b. The other configurations and operational effects are the same as those of the first and fifth examples.

Seventh Example

Figure 19:
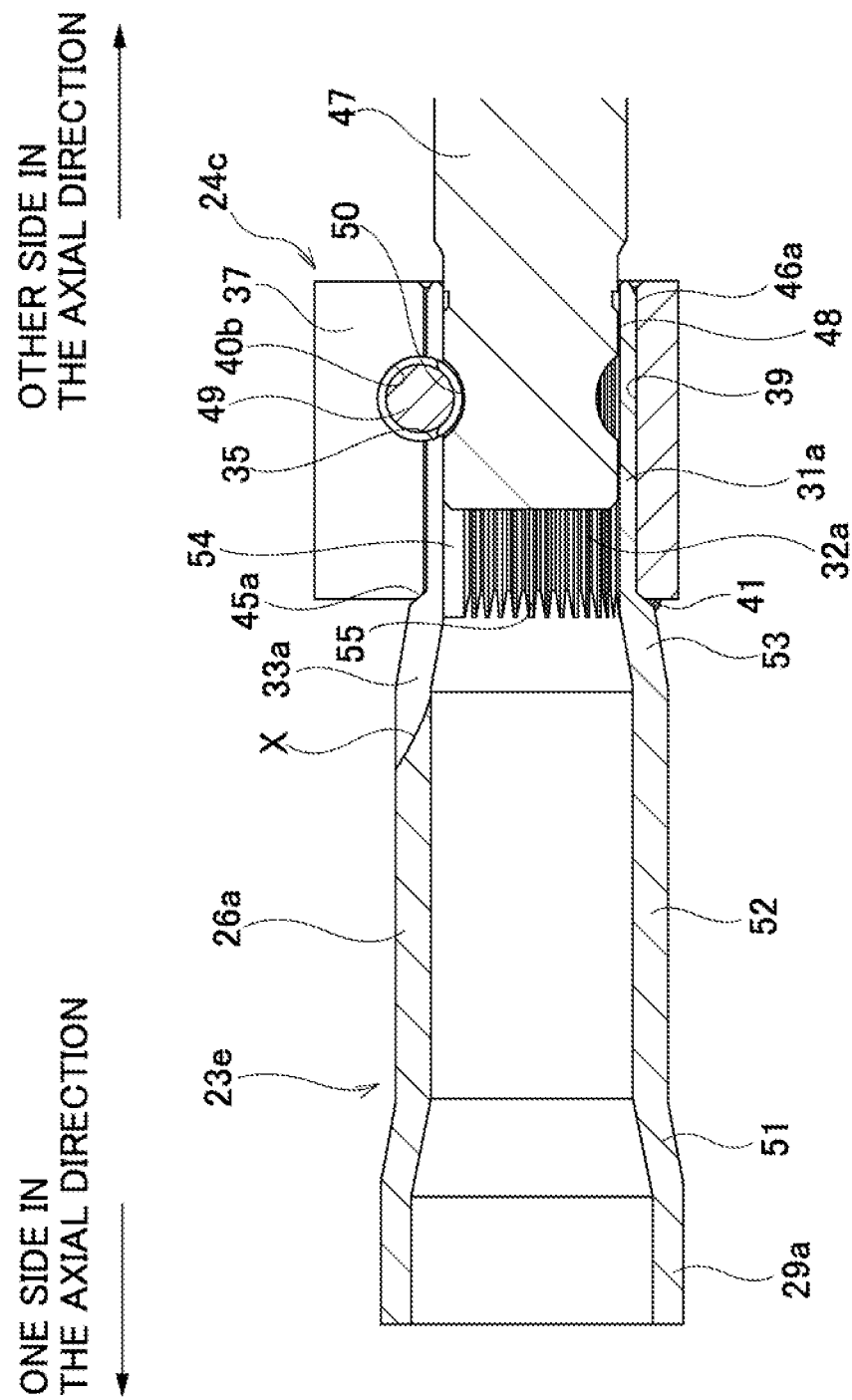
FIG. 19 is a cross-sectional view illustrating a connected state between a torque transmission shaft and a shaft connected to the torque transmission shaft according to a seventh example of an embodiment of the present invention.

A seventh example of an embodiment of the present invention will be described with reference to FIG. 19. In this example, the position of the step surface 45a in the axial direction is located farther on the one side in the axial direction than the structure of the fifth example. Accordingly, the length of the fitting cylindrical portion 46a in the axial direction is longer than the length of the fitting cylindrical portion 46 in the axial direction of the fifth example. In this example, the position of the step surface 45a in the axial direction coincides with the position of the incomplete serration portion 55 in the axial direction arranged at the one end portion in the axial direction of the female serration 32a. In other words, the step surface 45a is located outward in the radial direction of the incomplete serration portion 55.

When the clamp 24c is externally fitted to the fitting cylindrical portion 46a, by abutting the end surface of the clamp 24c on the one side in the axial direction against the step surface 45a, the clamp 24c may be positioned in the axial direction with respect to the shaft 23e. In the present example, the length of the fitting cylindrical portion 46a in the axial direction is longer than the length of the fitting cylindrical portion 46 in the axial direction of the fifth example, and correspondingly, the length of the clamp 24c in the axial direction is also longer than the length of the clamp 24 in the axial direction of the fifth example.

In this example as well, as in the structure of the first example, by forming a weld portion 41 by spot welding at one location in the circumferential direction on the opposite side from the slit 33 in the diametric direction of the shaft 23e of the portion between the opening edge on the one side in the axial direction of the insertion hole 39 of the clamp 24 and the outer peripheral surface of the shaft 23e, the shaft 23e and the clamp 24c are fixed together by welding. In this example, the step surface 45a is positioned outward in the radial direction of the incomplete serration portion 55, so the position of the weld portion 41 in the axial direction coincides with the position of the incomplete serration portion 55 in the axial direction. In other words, the weld portion 41 is positioned outward in the radial direction of the incomplete serration portion 55.

In this example, the weld portion 41 is positioned outward in the radial direction of the incomplete serration portion 55 where there is no serration engagement with the male serration 48 of the shaft 47, so the portion of the female serration 32a that engages with the male serration 48 of the shaft 47 with a serration engagement is prevented from thermal deformation due to welding, and the clamp 24c and the shaft 47 may be smoothly coupled. Moreover, the length of the fitting cylindrical portion 46a in the axial direction is longer than the length of the fitting cylindrical portion 46 in the axial direction of the fifth example, so the fitting length between the shaft 23e and the clamp 24c may be sufficiently maintained, and the fitting strength may be stabilized. The other configurations and operational effects are the same as those of the first and fifth examples.

Eighth Example

Figure 20:
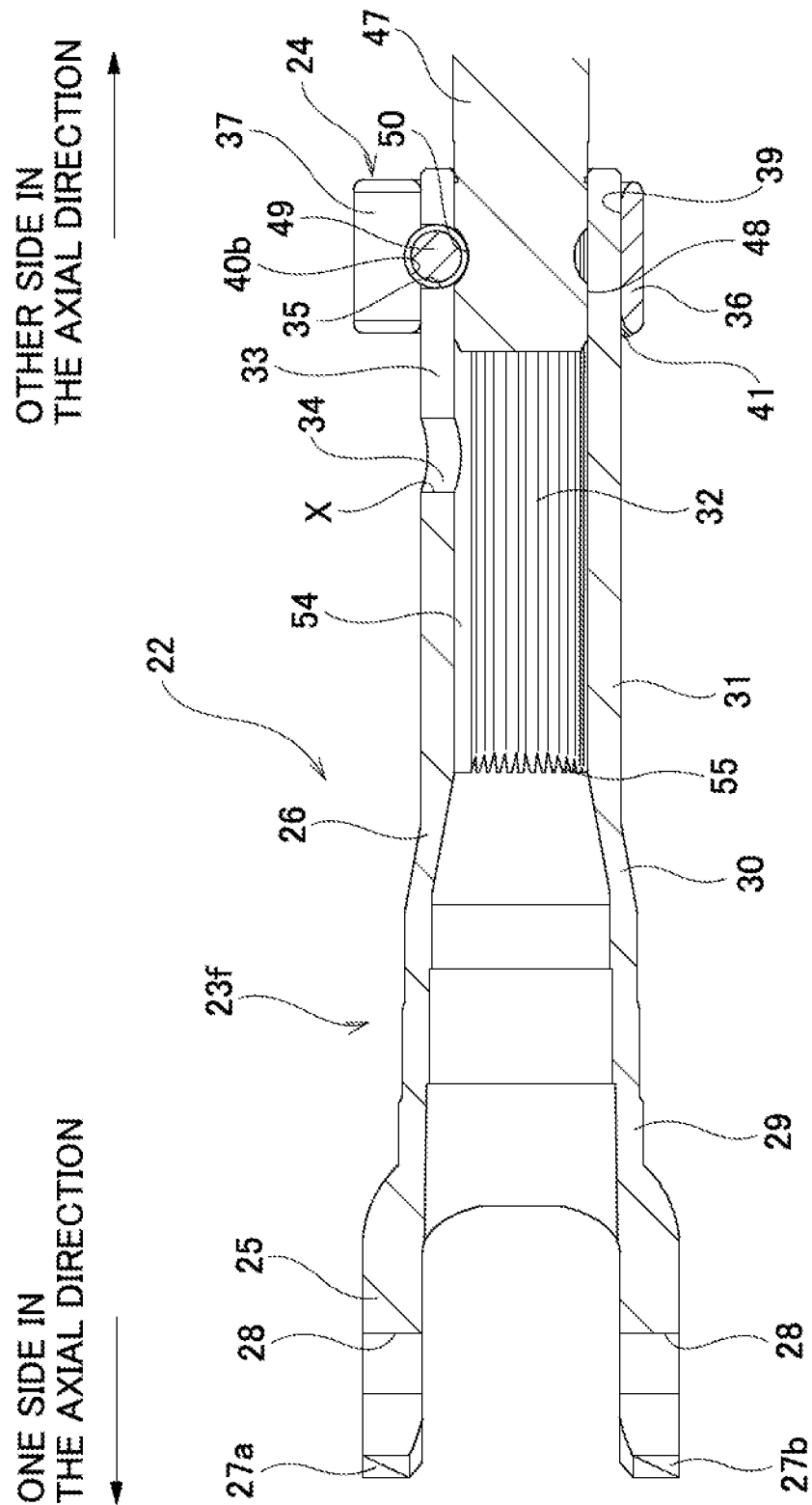
FIG. 20 is a cross-sectional view illustrating a connected state between a torque transmission shaft and a shaft connected to the torque transmission shaft according to an eighth example of an embodiment of the present invention.
Figure 21:
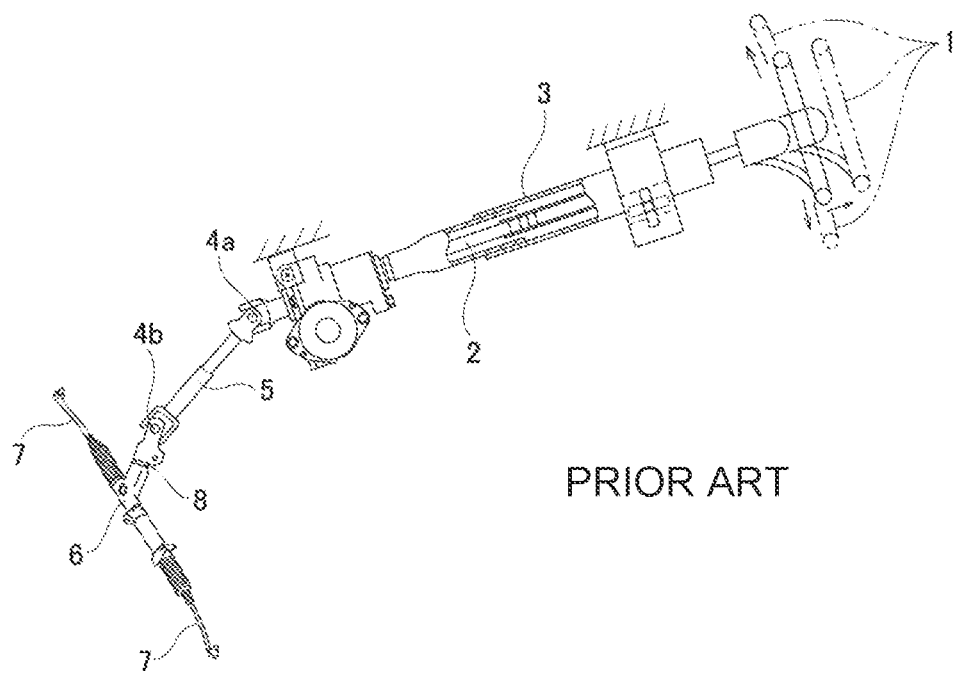
FIG. 21 is a partial cross-sectional side view illustrating a conventional steering apparatus.
Figure 22:
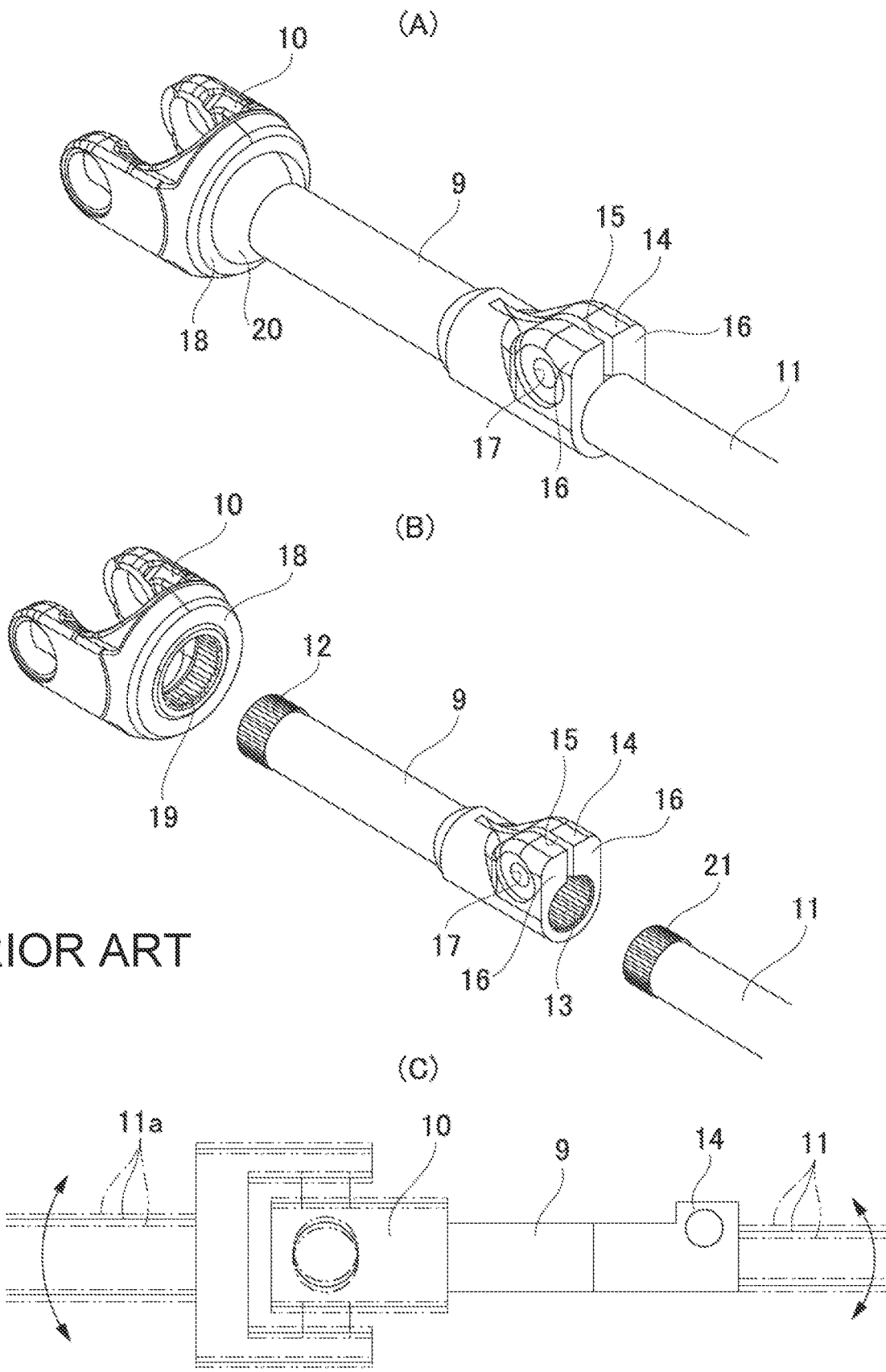
FIG. 22A is a perspective view illustrating a structure in which a yoke and a rotating shaft are connected by a torque transmission shaft, which the present inventors previously considered.
FIG. 22B is an exploded perspective view of the structure illustrated in FIG. 22A.
FIG. 22C is a schematic diagram for explaining a state in which whirling occurs of a shaft connected to the torque transmission shaft in the structure illustrated in FIG. 22A.

An eighth example of an embodiment of the present invention will be described with reference to FIG. 20. The shaft 23f of the present example has a stress relieving portion 34 at the deepest end portion X of the slit 33, similarly to the shaft 23 of the first example. In addition, similar to the shaft 23c of the fifth example, the shaft 23f includes toothless portions 54 at portions of the inner peripheral surface of the small-diameter cylindrical portion 31 located on both sides of the slit 33 in the circumferential direction. Accordingly, when the other end portion in the axial direction of the shaft 23f is reduced in diameter, the male serration 48 that is provided on the outer peripheral surface of the shaft 47 is prevented from local contact. The other configurations and operational effects, including that the shaft 23e and the clamp 24 are fixed together by welding, are the same as those of the first and fifth examples.

When implementing the present invention, the position in the circumferential direction of the slit that is provided in the shaft is not limited to the position indicated in each example of an embodiment of the present invention. The number of slits is also not limited to one, and a plurality of slits may be provided. The shape of the stress relieving portion provided at the deepest end portion of the slit is not limited to the shape indicated in each example of an embodiment of the present invention, and may be an arbitrary shape such as an elliptical shape, a drop shape or the like. Each of the pair of installation holes provided in the clamp may be formed as through holes and used in combination with a nut. In regard to the fixing structure between the shaft and the clamp, instead of fixing the shaft and clamp together by welding, the shaft and the clamp can be immovably fixed together in the axial direction by press-fitting (lightly press-fitting) the shaft into the clamp. Furthermore, when implementing the present invention, the structures of each of the examples of embodiments of the present invention may be implemented by being appropriately combined. For example, the structure of the second example or the third example capable of preventing relative rotation between the shaft and the clamp and the structure of the fourth example capable of positioning the clamp in the axial direction with respect to the shaft may be simultaneously implemented.

REFERENCE SIGNS LIST

1 Steering wheel
2 Steering shaft
3 Steering column
4a, 4b Universal joint
5 Intermediate shaft
6 Steering gear unit
7 Tie rod
8 Pinion shaft
9 Torque transmission shaft
10 Yoke
11, 11a Shaft
12 Male serration
13 Female serration
14 Clamp portion
15 Non-continuous portion
16 Flange portion
17 Installation hole
18 Base portion
19 Female serration
20 Weld bead portion
21 Male serration
22 Torque transmission shaft
23, 23a, 23b, 23c, 23d, 23e, 23f Shaft
24, 24a, 24b, 24c Clamp
25 Yoke portion
26, 26a, 26b Cylindrical portion
27a, 27b Arm portion
28 Circular hole
29, 29a, 29b Large-diameter cylindrical portion
30, 30a Conical cylindrical portion
31, 31a, 31b Small-diameter cylindrical portion
32, 32a, 32b Female serration
33, 33a Slit
34 Stress relieving portion
35 Engaging concave groove
36 Base portion
37 Flange portion
38 Non-continuous portion
39, 39a Insertion hole
40a, 40b Installation hole
41 Weld portion
42 Projecting portion
43 Shaft-side flat surface portion
44 Clamp-side flat surface portion
45 Step surface
46 Fitting cylindrical portion
47 Shaft
48 Male serration
49 Tightening bolt
50 Annular concave groove
51 Large-diameter side cylindrical cone portion
52 Medium-diameter cylindrical portion
53 Small-diameter side cylindrical cone portion
54 Toothless portion
55 Incomplete serration portion
X Deepest end portion

The invention claimed is:

1. A torque transmission shaft, comprising:
a shaft having a hollow shape and comprising a yoke portion provided on one end portion in an axial direction; a slit extending in the axial direction and provided on the other end portion in the axial direction; and a female serration provided on an inner peripheral surface of the other end portion in the axial direction; and
a clamp having a partial cylindrical shape and comprising a non-continuous portion arranged at one location in a circumferential direction; and a pair of flange portions arranged on both sides of the non-continuous portion in the circumferential direction and respectively having an installation hole into which a tightening member is inserted; wherein
the clamp is externally fitted around the other end portion in the axial direction of the shaft, and capable of reducing a diameter of the other end portion in the axial direction of the shaft by reducing a width dimension of the non-continuous portion,
the shaft has a small-diameter cylindrical portion at the other end portion in the axial direction, the female serration is provided only on an inner peripheral surface of the small-diameter cylindrical portion, and
one end portion in the axial direction of the slit is located farther on one side in the axial direction than the small-diameter cylindrical portion, and is positioned farther on the one side in the axial direction than one end edge in the axial direction of the female serration and in a portion having an outer diameter dimension and inner diameter dimension that are larger than those of the small-diameter cylindrical portion.

2. The torque transmission shaft according to claim 1, wherein the shaft has a conical cylindrical portion in a portion adjacent to one side in the axial direction of the small-diameter cylindrical portion and having an outer diameter dimension and an inner diameter dimension that increase going toward the one side in the axial direction; and the one end portion in the axial direction of the slit is located farther on the one side in the axial direction than the conical cylindrical portion.

3. The torque transmission shaft according to claim 1, wherein the shaft has toothless portions in which the female serration is not provided in portions of the inner peripheral surface that are adjacent to both sides of the slit in the circumferential direction.

4. The torque transmission shaft according to claim 1, wherein the shaft has an engaging concave groove that extends in a direction orthogonal to a center axis of the shaft at a portion of an outer peripheral surface facing opening portions of the installation holes, with the tightening member being arranged therein.

5. The torque transmission shaft according to claim 1, wherein positions in the circumferential direction of the slit and the non-continuous portion coincide with each other, and a width dimension of the slit and a width dimension of the non-continuous portion in a free state of the shaft and the clamp are the same.

6. The torque transmission shaft according to claim 1, wherein the shaft has a step surface on an outer peripheral surface facing toward the other side in the axial direction; and by abutting the clamp against the step surface, the clamp is positioned in the axial direction with respect to the shaft.

7. The torque transmission shaft according to claim 1, wherein the shaft and the clamp are fixed together so as not to be able to move in the axial direction.

8. The torque transmission shaft according to claim 7, wherein the shaft and the clamp are fixed together by welding.

9. The torque transmission shaft according to claim 8, wherein the female serration has an incomplete serration portion at one end portion in the axial direction, in which a groove depth of a female serration groove of the female serration decreases going toward one side in the axial direction, and a weld fixing portion between the shaft and the clamp is positioned on an outer diameter side of the incomplete serration portion.

\* \* \* \* \*